(12) United States Patent
Grannell et al.

(10) Patent No.: US 8,961,923 B2
(45) Date of Patent: *Feb. 24, 2015

(54) AUTOTHERMAL AMMONIA CRACKER

(71) Applicants: Shawn Grannell, Ann Arbor, MI (US); Donald E. Gillespie, Ann Arbor, MI (US)

(72) Inventors: Shawn Grannell, Ann Arbor, MI (US); Donald E. Gillespie, Ann Arbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/132,953

(22) Filed: Dec. 18, 2013

(65) Prior Publication Data

US 2014/0105816 A1  Apr. 17, 2014

Related U.S. Application Data

(63) Continuation-in-part of application No. 13/537,125, filed on Jun. 29, 2012, now Pat. No. 8,623,285, which is a continuation-in-part of application No. 13/370,910, filed on Feb. 10, 2012, now Pat. No. 8,691,182, which is a continuation-in-part of application No. 13/117,532, filed on May 27, 2011, now abandoned.

(60) Provisional application No. 61/419,490, filed on Dec. 3, 2010, provisional application No. 61/348,898, filed on May 27, 2010.

(51) Int. Cl.
*C01B 3/02* (2006.01)
*C01B 3/06* (2006.01)
*C01B 3/04* (2006.01)

(52) U.S. Cl.
CPC . *C01B 3/06* (2013.01); *C01B 3/047* (2013.01); *Y02E 60/364* (2013.01)

USPC .................................................. 423/648.1

(58) Field of Classification Search
CPC ........................................................ C01B 3/00
See application file for complete search history.

(56) References Cited

U.S. PATENT DOCUMENTS

| | | | |
|---|---|---|---|
| 1,915,120 | A | 6/1933 | Burke |
| 1,920,886 | A | 8/1933 | Pier et al. |
| 2,013,809 | A | 9/1935 | Salisbury |
| 2,140,254 | A | 12/1938 | Zavka |
| 2,264,693 | A | 12/1941 | Gier |

(Continued)

FOREIGN PATENT DOCUMENTS

| WO | WO-2011/107279 | 9/2011 |
|---|---|---|
| WO | WO-2011/150370 | 12/2011 |

OTHER PUBLICATIONS

Kim, J. et al., A micro reforming system integrated with a heat-recirculating micro-combustor to produce hydrogen from ammonia, *International Journal of Hydrogen Energy*, 36(3): 1974-83, Dec. 8, 2010.

*Primary Examiner* — Melvin Curtis Mayes
*Assistant Examiner* — Kenneth Vaden
(74) *Attorney, Agent, or Firm* — Gifford, Krass, Sprinkle, Anderson & Citkowski, P.C.

(57) ABSTRACT

Apparatus and methods are provided for separately preheating gaseous ammonia and an oxygen-containing gas mixture, combusting them to form a hydrogen-containing gas mixture, and cooling the hydrogen-containing gas mixture in conjunction with the preheating of the next ammonia and the preheating of the next oxygen-containing gas mixture. Combustion may occur at combinations of pressure and temperature that permit rapid and non-catalyzed decomposition of the ammonia.

20 Claims, 15 Drawing Sheets

(56) References Cited

U.S. PATENT DOCUMENTS

| | | |
|---|---|---|
| 2,519,696 A | 8/1950 | Orr, Jr. |
| 2,578,193 A | 12/1951 | Marshall, Jr. |
| 2,601,221 A | 6/1952 | Rosenblatt |
| 2,606,875 A | 8/1952 | Rosenblatt |
| 3,025,145 A | 3/1962 | Terpenning |
| 3,379,507 A | 4/1968 | Becker |
| 3,505,027 A | 4/1970 | Breitbach |
| 3,598,538 A | 8/1971 | Peacock |
| 4,069,071 A | 1/1978 | Normand |
| 4,157,270 A | 6/1979 | Martignoni et al. |
| 4,179,407 A | 12/1979 | Iiyama et al. |
| 4,219,528 A | 8/1980 | Normand |
| 4,416,224 A | 11/1983 | Hobby et al. |
| 4,478,177 A | 10/1984 | Valdespino |
| 4,480,595 A | 11/1984 | Hobby et al. |
| 4,750,453 A | 6/1988 | Valdespino |
| 4,755,282 A | 7/1988 | Samish et al. |
| 4,788,004 A | 11/1988 | Pinto et al. |
| 5,055,282 A | 10/1991 | Shikada et al. |
| 5,139,756 A | 8/1992 | Shikada et al. |
| 5,976,723 A | 11/1999 | Boffito et al. |
| 6,007,699 A | 12/1999 | Cole |
| 6,096,106 A | 8/2000 | Ruhl et al. |
| 6,299,847 B1 | 10/2001 | Allen |
| 6,488,905 B2 | 12/2002 | Graville |
| 6,800,386 B1 | 10/2004 | Wang et al. |
| 6,936,363 B2 | 8/2005 | Kordesch et al. |
| 7,527,661 B2 | 5/2009 | Chellappa et al. |
| 7,574,993 B2 | 8/2009 | Gillespie et al. |
| 8,272,353 B2 | 9/2012 | Dincer et al. |
| 8,561,578 B2 | 10/2013 | Miyagawa et al. |
| 8,691,182 B2 * | 4/2014 | Grannell et al. ........... 423/658.2 |
| 2002/0056580 A1 | 5/2002 | Friebe et al. |
| 2005/0037244 A1 | 2/2005 | Goetsch et al. |
| 2006/0112636 A1 | 6/2006 | Chellappa et al. |
| 2006/0204799 A1 | 9/2006 | Ishikawa et al. |
| 2007/0036707 A1 | 2/2007 | Dalla Betta et al. |
| 2009/0087801 A1 * | 4/2009 | Schoegl et al. .................... 431/2 |
| 2011/0283959 A1 | 11/2011 | Aso et al. |
| 2011/0283960 A1 | 11/2011 | Hikazudani et al. |
| 2011/0293510 A1 | 12/2011 | Grannell et al. |
| 2012/0015802 A1 | 1/2012 | Okamura et al. |
| 2012/0040261 A1 | 2/2012 | Nakanishi et al. |
| 2012/0148925 A1 | 6/2012 | Grannell et al. |

* cited by examiner

AUTOTHERMAL AMMONIA CRACKER

REFERENCE TO RELATED APPLICATIONS

This application is a continuation-in-part of U.S. patent application Ser. No. 13/537,125, filed Jun. 29, 2012, which is a continuation-in-part of U.S. patent application Ser. No. 13/370,910, filed Feb. 10, 2012, which is a continuation-in-part of U.S. patent application Ser. No. 13/117,532, filed May 27, 2011, now abandoned, which claims priority from U.S. Provisional Patent Application. Ser. Nos. 61/348,898, filed May 27, 2010, and 61/419,490, filed Dec. 3, 2010, the entire content of each of which is incorporated herein by reference.

FIELD OF THE INVENTION

The present disclosure relates to decomposing or "cracking" ammonia, and more particularly to cracking ammonia with heat released by burning a portion of the ammonia or by burning products of ammonia decomposition with an oxygen-containing gas mixture. A counterflow heat exchanger preheats ammonia and an oxygen-containing gas mixture in conjunction with cooling of reaction products. The ammonia may reach combinations of pressure and temperature that permit rapid and non-catalyzed decomposition of the ammonia.

BACKGROUND OF THE INVENTION

The costs associated with storing gaseous hydrogen and transporting it to end users are often far greater than the cost of producing the hydrogen itself. Hydrogen's high storage and transportation costs are attributed to the expense of using high-pressure tanks for containing the gas. Instead, hydrogen can be combined with cheap and abundant atmospheric nitrogen to make ammonia, which is then distributed. Ammonia is storable indefinitely as a liquid at a pressure of about 10 bars at 300 Kelvin.

Systems that make ammonia from nuclear energy are known to the art. The sustained manufacture of very large quantities of ammonia, from nuclear energy, does not appear to be a scientific issue. Ammonia, as made from coal, natural gas, or nuclear energy, may be cheaper on a lower heating value energy basis, than are other liquid fuels as made from these or from petroleum. An autothermal ammonia cracker can convert the ammonia into a hydrogen-containing gas mixture, on demand. The hydrogen is then directed to any of the various applications that use a fuel, or that use hydrogen for any purpose.

U.S. Pat. No. 2,578,193 discloses a heat exchanged, electrically powered, catalytic ammonia decomposer, which operates at about 650° C., and is said to be operable ". . . by unattended small children to produce a gas for the purpose of filling balloons." U.S. Pat. No. 3,598,538 discloses a heat exchanged, electrically powered ammonia cracker, which can be operated at temperatures approaching 1649° C., but more typically heats the ammonia to 927° C.

The ammonia combustors disclosed in U.S. Pat. Nos. 5,904,910 and 6,488,905 can decompose ammonia non-catalytically by combustion of some of the ammonia with a combination of purified oxygen and air. However, neither of these patents discloses a provision for heat exchanging the combustor inputs and outputs, immediately before and after combustion and decomposition of the ammonia in the combustor. These combustors do not preheat the ammonia and oxygen. Preheating, by heat exchange of inputs and outputs, is necessary for an efficient autothermal recovery of hydrogen from ammonia. Preheating also enables ignition and combustion of ammonia with air as the sole oxidizer.

U.S. Patent Application Publication No. 2005/0037244 discloses a heat exchanged, autothermal ammonia cracker that preheats, combusts, and decomposes a single reactant mixture containing ammonia and air at temperatures up to 1200° C. However, no description is given for a counterflow heat exchanger that separately preheats the ammonia and air and before combustion. Separate preheating prevents ignition of the ammonia and its decomposition products during the preheating step, which confers particular advantages later described herein.

U.S. Pat. No. 7,794,579 further discloses that the ammonia cracker from U.S. Patent Application Publication No. 2005/0037244 may be operated within a temperature range of 200-2000° C. The ammonia cracker appears to operate in the same manner at 200° C. as it does at 2000° C. The specified temperature range was simply broadened beyond 1200° C. without disclosing additional features within the broadened temperature range. No description is given for rapid decomposition of non-burned ammonia molecules that do not contact a catalyst, for any temperature or for any combination of temperature and pressure.

Based on the foregoing, there is a need for a heat exchanged, autothermal ammonia cracker that separately preheats ammonia and an oxygen-containing gas mixture and then combusts them to form a hydrogen-containing gas mixture. The ammonia may be decomposed at combinations of gas pressure and gas temperature that permit rapid and non-catalyzed decomposition of the ammonia.

SUMMARY OF THE INVENTION

This invention relates to the autothermal conversion of ammonia and air into a hydrogen-containing gas mixture. A method of cracking ammonia in accordance with the invention comprises flowing ammonia and air into a heat exchanger, wherein combustion and decomposition of the ammonia occurs. The decomposition of the ammonia may occur at a temperature that is high enough for rapid and non-catalyzed decomposition of the ammonia. A mixture of gaseous products, including hydrogen gas, is produced by the reactions. The hydrogen is then directed to further uses.

An autothermal ammonia cracker, constructed in accordance with the invention, includes separate inlets for receiving ammonia and for receiving air. The ammonia and air are separately preheated while flowing toward a combustor. Upon arrival at the combustor, the preheated ammonia and preheated air are combined and combusted within or downstream of the combustor. The now-combusting gases may attain a gas temperature that is higher than 1200° C., thereby decomposing non-burned ammonia molecules, possibly without the aid of a catalyst. In some cases, the combusting gases attain a gas temperature that is higher than 1400° C. A hydrogen-containing gas mixture is thereby formed from the ammonia and from the air. The preheating of the ammonia and air is achieved by counterflow heat exchanging the incoming ammonia and incoming air with the outgoing hydrogen-containing gas mixture. The outlet of the ammonia cracker expels the hydrogen-containing gas mixture.

DETAILED DESCRIPTION OF THE INVENTION

Figure 1:
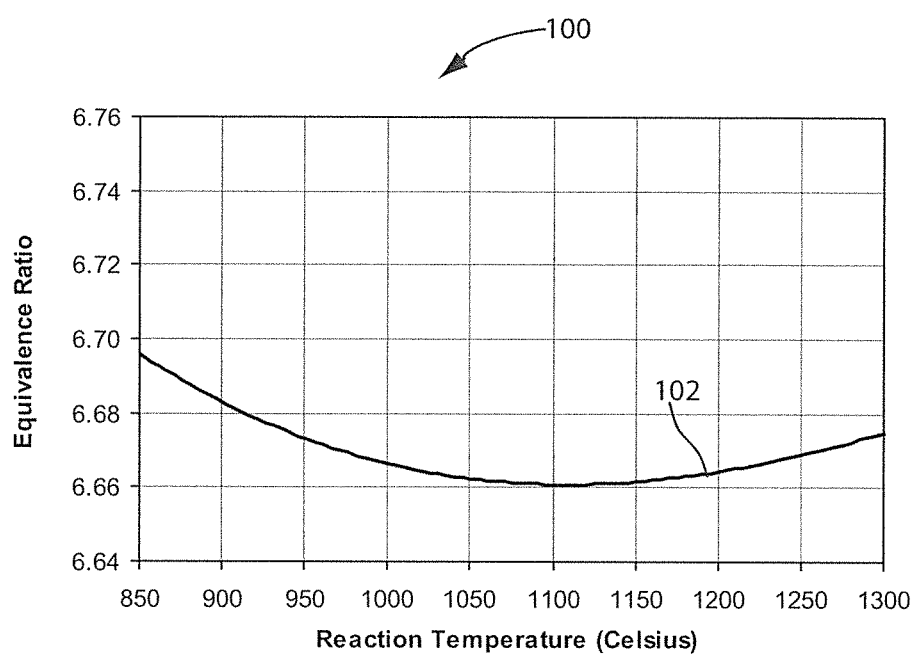
FIG. 1 is a graph of equivalence ratios, used for the calculation of a theoretical upper performance limit.

This invention relates to the conversion of ammonia into a gas mixture containing hydrogen. A method of cracking ammonia in accordance with the invention comprises flowing ammonia and air into a heat exchanged ammonia cracker, wherein ammonia or its decomposition products are burned and ammonia is decomposed. The ammonia may reach a temperature that is high enough for rapid and non-catalyzed decomposition of the ammonia. A hydrogen-containing gas mixture, resulting from the reactions, is expelled from the outlet of the ammonia cracker. The hydrogen is then directed to further uses.

"Combustion" refers herein to oxidation of hydrogen into water vapor or oxidation of ammonia into water vapor and nitrogen, including the participation of an oxygen-containing gas mixture in these reactions, and possibly also including decomposition of ammonia into hydrogen and nitrogen. "Burning" refers specifically to oxidation of hydrogen into water vapor or oxidation of ammonia into water vapor and nitrogen. "Decomposition" refers to conversion of ammonia into hydrogen and nitrogen. Hence the process of combustion includes burning, and may also include decomposition.

Typically, the ammonia is combusted with air. "Air" refers herein to the naturally occurring atmospheric mixture of mostly nitrogen and oxygen, which is not enriched in oxygen content. Purified oxygen may be usefully incorporated into a startup strategy. The scope of "purified oxygen" is intended to cover oxygen that is purified to a percentage that is greater than the oxygen percentage of the naturally-occurring atmospheric mixture, up to and including 100 percent oxygen. Accordingly, a mixture of purified oxygen and air is also purified oxygen. Wherever air is specified herein, purified oxygen is also permitted, but not required. The scope of an "oxygen-containing gas mixture" is intended to cover air, purified oxygen, or any combination thereof, possibly also in combination with substantially inert gas.

The ammonia may be pure or it may contain small quantities of substantially inert impurities such as water or others, which are ignored herein. Hence the scope of "ammonia" is intended to cover pure ammonia, and ammonia with impurities, which are gaseous unless specified otherwise. The "equivalence ratio" herein refers to the ratio, of ammonia that is available for burning or decomposition, to the quantity of ammonia that is eventually burned with the air or other oxygen-containing gas mixture.

The incoming ammonia and air are counterflow heat exchanged with reaction products formed from the ammonia and from the air, such that no energy is expended in preheating the ammonia and air up to an appropriate range of reaction temperatures. In a theoretical example, an equivalence ratio is chosen, such that the heat released by exothermic formation of water vapor is balanced with the heat absorbed by endothermic decomposition of ammonia for zero temperature rise when all of the ammonia is combusted and decomposed. Once started, the overall reaction continues without an external input of energy, and is thus an autothermal reaction. The theoretical limits of efficiency and yield are unaffected by inert impurities. The theoretical limits of efficiency and yield are also unaffected by division of the burning and decomposition reactions into separate channels, wherein heat from burning in one channel is transferred to another channel for decomposing ammonia therein. Such an overall reaction is also effectively autothermal.

FIG. 1 illustrates a graph 100 showing a curve 102 which is used for calculating a theoretical upper performance limit for an autothermal ammonia cracker. Ammonia and air are preheated to a reaction temperature, and then the ammonia is fully combusted and decomposed at that temperature, at an equivalence ratio that is chosen for a zero temperature rise. Each equivalence ratio on curve 102 is 1.5 times the molar enthalpy of formation of water vapor, divided by the molar enthalpy of formation of ammonia, for each reaction temperature. Curve 102 has a minimum of 6.66 at about 1100° C. The heat released by the formation of water vapor is balanced with the heat absorbed by the decomposition of ammonia at equivalence ratios of not less than 6.66, for a broad range of reaction temperatures. The theoretical upper performance limit thus corresponds to a full ammonia decomposition yield and an ammonia-to-hydrogen thermal conversion efficiency of 97.3 percent on a lower heating value basis, obtained at an equivalence ratio of 6.66.

Figure 2:
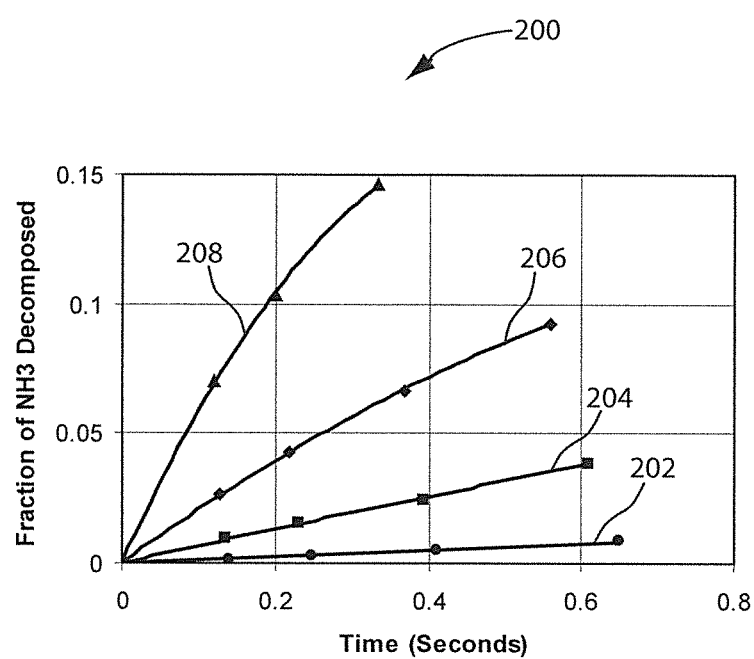
FIG. 2 is a graph showing the rate of non-catalyzed ammonia decomposition at a low decomposition yield.

FIG. 2 illustrates a graph 200 showing the fraction of pure ammonia (without oxygen) decomposed, as a function of residence time, in a heated, non-catalytic chamber. Curves 202, 204, 206, and 208 correspond to temperatures of 1156° C., 1215° C., 1272° C., and 1315° C., respectively, and a pressure of 1 bar. Ammonia appears to decompose at an approximately constant rate at a given temperature, from zero decomposition, up until about 0.05 (5 percent) of the ammonia is decomposed. The rate of ammonia decomposition declines above 5 percent. The rate of decline can clearly be seen near 10 percent, and the decline is faster than can be explained by exponential decay of the ammonia.

Figure 3:
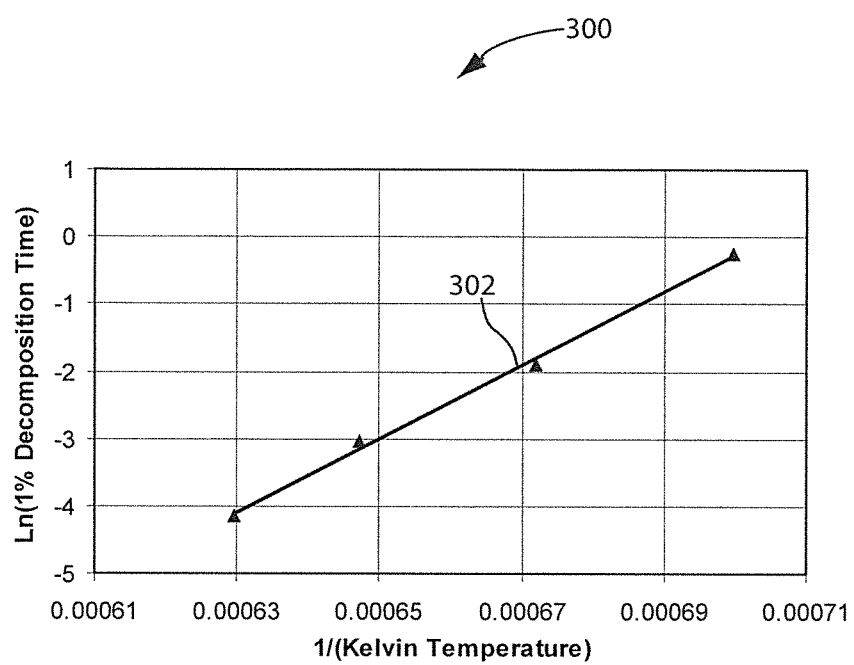
FIG. 3 is a graph showing the temperature trend for the time required to decompose 1 percent of the ammonia.

FIG. 3 illustrates a graph 300 showing a temperature trend, for the time required to decompose 1 percent of the ammonia. The data for line 302 are derived from the results shown in graph 200. The Ln( ) function is the base e logarithm, wherein e is approximately 2.718, and the Ln( ) function is defined to be zero when the time is 1 second. The temperature range shown is about 1150-1320° C. According to line 302, the temperature required to decompose 1 percent of the ammonia in 1 second is 1146° C. The slope of line 302 indicates that when the fraction of ammonia decomposed is small, the apparent activation energy for the non-catalyzed decomposition of ammonia is about 455 kilojoules per mole of ammonia. This activation energy of 455 kilojoules per mole is nearly equal to the enthalpy change for breaking the first of the three H—N bonds of the ammonia molecule.

Figure 4:
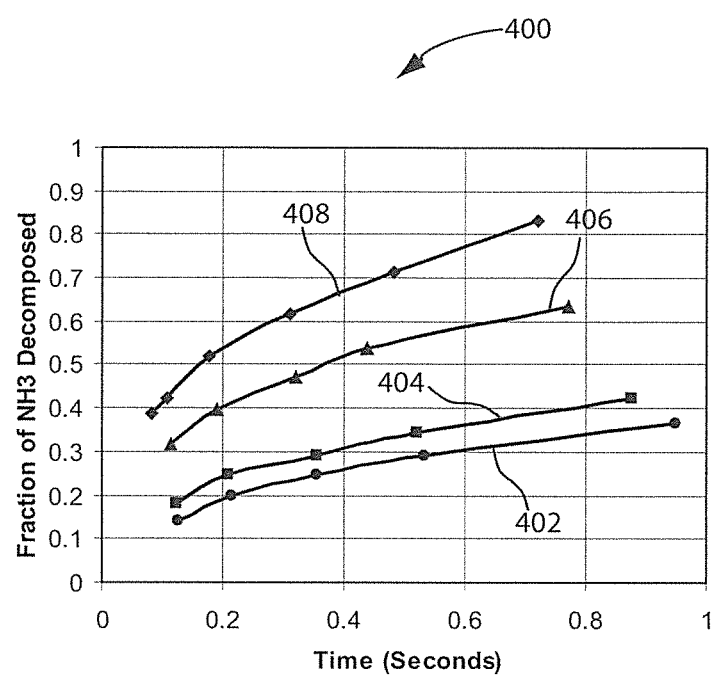
FIG. 4 is a graph showing the rate of non-catalyzed ammonia decomposition at a high decomposition yield.

FIG. 4 illustrates a graph 400 containing additional data on the decomposition of pure ammonia, at a higher range of decomposition yields than the range shown in graph 200. Curves 402, 404, 406, and 408 correspond to temperatures of 1361° C., 1373° C., 1420° C., and 1455° C., respectively, and a pressure of 1 bar. The fraction of ammonia decomposed is approximately proportional to the cube root of time, and the overall reaction rate is exponentially dependent on temperature.

Figure 5:
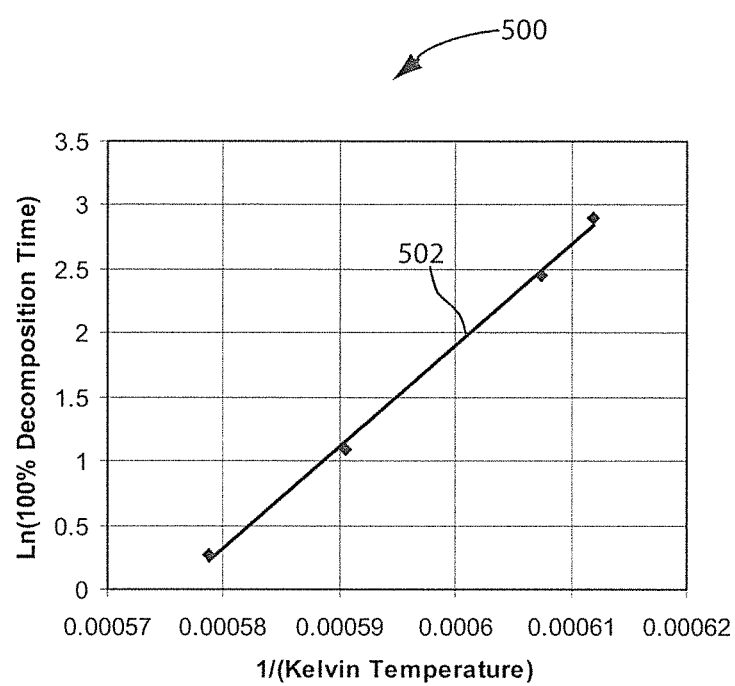
FIG. 5 is a graph showing the temperature trend for the time required to decompose 100 percent of the ammonia.

FIG. 5 illustrates a graph 500 showing the temperature trend, for the time required to decompose 100 percent of the ammonia. The data for line 502 are based on the results shown in graph 400. Again, the Ln( ) function is defined to be zero when the time is 1 second. The temperature range shown is about 1360-1460° C. According to line 502, the temperature required to decompose 100 percent of the ammonia in 1 second is 1463° C. The slope of line 502 indicates that when the fraction of ammonia decomposed is large, the apparent activation energy for the non-catalyzed decomposition of ammonia is about 657 kilojoules per mole of ammonia. This activation energy of 657 kilojoules per mole is nearly halfway between the enthalpy change for breaking the first of the three H—N bonds of the ammonia molecule, and the enthalpy change for breaking both the first and second of the three H—N bonds.

Figure 6:
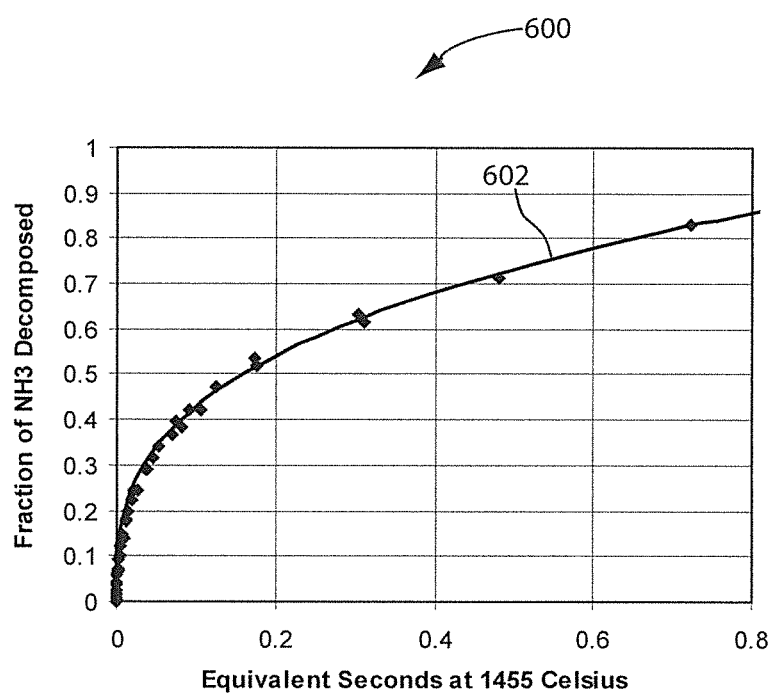
FIG. 6 is a graph showing the general form of non-catalyzed ammonia decomposition, as a function of time.

FIG. 6 illustrates a graph 600 showing the general curve 602 of ammonia decomposition as a function of time. The data are graphed on an equivalent time axis, wherein a longer time spent at a lower temperature is equivalent to a shorter time spent at a higher temperature, based on the activation energy of 657 kilojoules per mole. The time scale is normalized to 1455° C., such that at 1455° C., the equivalent time is the actual time. In one example, 1 second, spent at 1420° C., is equivalent to about 0.389 seconds, spent at 1455° C. A similar resealing of time, based on the activation energy of 657 kilojoules per mole, collapses all of the decomposition data from graphs 200 and 400 into a single curve 602. The slope of curve 602 is relatively very high near zero, so the different temperature trend, for the slopes of curves near zero, is not seen here. Curve 602 is 0.924, multiplied by the cube root of the time in equivalent seconds spent at 1455° C., which is the best fit to the data for the range shown. Curve 602 approaches 1 (100 percent) in 1.27 seconds. Ammonia fully decomposes non-catalytically in about 1.27 seconds at 1455° C., or about 3.26 seconds at 1420° C., or about 1 second at 1463° C., etc. when the pressure is 1 bar. Near 100 percent decomposition of the ammonia can be achieved in practice, even at elevated pressures, because the ammonia can be decomposed at a high temperature. Less than one part per million of ammonia survives intact in an equilibrium mixture at temperatures higher than 1400° C. and at a pressure of 10 bars. Less than 20 parts per million of ammonia survives intact in an equilibrium mixture at temperatures higher than 1200° C. and at a pressure of 100 bars.

Figure 7:
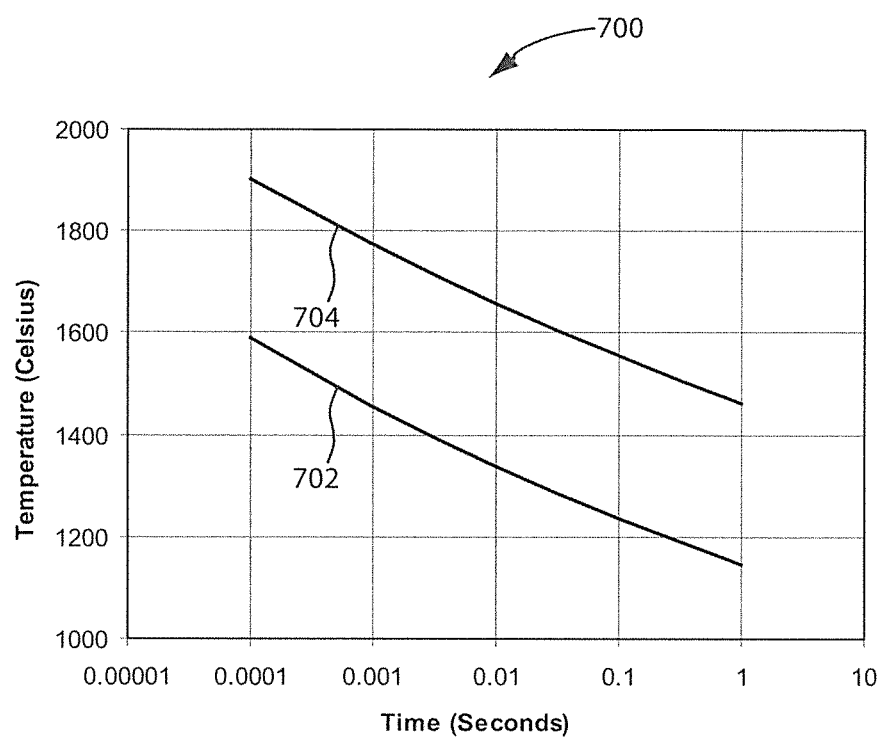
FIG. 7 is a graph showing the temperatures required for ignition, and for full ammonia decomposition.

FIG. 7 illustrates a graph 700 showing the combinations of time and temperature required for non-catalyzed ignition 702 and full decomposition 704 of ammonia at a pressure of 1 bar. It is a goal of this invention to decompose ammonia to a high ammonia decomposition yield and within a reasonable time. Ignition and decomposition times that are longer than 1 second, at a pressure of 1 bar, are burdensome from the standpoint of design. An ammonia cracker becomes large for a given throughput, and heat loss usually also becomes comparatively large, if either of these times is much longer than 1 second at 1 bar. Therefore, in some applications, peak gas temperatures higher than 1400° C. are required to obtain a full ammonia decomposition yield. How much higher, depends on dimensions and throughput, which in turn determine an ignition time and a holding time at peak temperature. Representative examples are given.

Ammonia ignites non-catalytically in the presence of oxygen, when enough ammonia decomposes and burns, at an ignition temperature, within an ignition time, such that the resulting adiabatic temperature rise increases the ammonia decomposition rate by a factor of e. For both curves 702 and 704, the ammonia decomposition rate increases by a factor of e for every 60° C. temperature increase near the left end of the displayed range, and for every 40° C. near the right end. For a mixture consisting of ammonia and a small portion of oxygen, a temperature increase of 50° C. is obtained when about 1 percent of the ammonia decomposes and burns adiabatically. Therefore, about 1 percent of the ammonia should decompose within the ignition time in order for ignition to occur. Ignition curve 702 is thus derived from an extrapolation of line 302 in graph 300.

Regarding ignition, the principal assumptions are that only ammonia that has decomposed can be burned, and that none of the reactions are catalyzed. However, oxygen molecules may attack ammonia directly at temperatures that are lower than the ignition temperature 702, and a catalyst will ignite ammonia in the presence of oxygen at temperatures that are lower than the ignition temperature 702, so it is possible that the ammonia could ignite in the presence of oxygen at combinations of ignition time and temperature that are below curve 702. Partially decomposed ammonia will also ignite in the presence of oxygen at temperatures that are lower than the ignition temperature 702. The ignition curve 702 thus defines an upper bound on combinations, of time and temperature, that ammonia can be expected to tolerate without igniting in the presence of oxygen at a pressure of 1 bar.

Separately flowed ammonia and air are guaranteed to ignite upon mixing, at combinations of preheat temperature and holding time in the combustor that are far above the ignition curve 702. The ammonia and air ignite spontaneously if they are held in a combustor for a holding time that is longer than the ignition time, at a given preheat temperature. In one example, the ammonia is allowed 0.001 seconds for ignition, and a preheat temperature of 1460° C. or higher is sufficient for ignition, according to the ignition curve 702. In another example, the ammonia is allowed 0.01 seconds for ignition, and a preheat temperature of 1340° C. or higher is sufficient for ignition, according to the ignition curve 702. In both examples, the ignition temperatures are higher than 1200° C. at a pressure of 1 bar. It is this preheating of the ammonia and air, by the heat exchanger, which facilitates the ignition and combustion of ammonia with air.

It was discovered that a rich, premixed ammonia/air mixture ignites in a heated, non-catalytic chamber in about 0.1 seconds at a pressure of 1 bar and a temperature of about 1200° C. This result is in close agreement with ignition curve 702. Therefore, fully non-catalyzed ignition of ammonia and air occurs when the preheat temperature is about 1200° C. or higher at a pressure of 1 bar, depending on flow conditions.

The full decomposition curve 704 defines a region of combinations, of peak temperature and holding time at peak temperature, which are sufficient to fully decompose ammonia at a pressure of 1 bar. Curve 704 is thus derived from an extrapolation of line 502 in graph 500. In one example, all of the ammonia is decomposed when the ammonia is held at a peak temperature of about 1770° C. for 0.001 seconds, according to the full decomposition curve 704. In another example, all of the ammonia is decomposed when the ammonia is held at a peak temperature of about 1660° C. for 0.01 seconds, according to the full decomposition curve 704. In yet another example, all of the ammonia is decomposed when the ammonia is held at a peak temperature of about 1560° C. for 0.1 seconds, according to the full decomposition curve 704. In all three examples, the temperatures required for full decomposition of the ammonia are higher than 1400° C. at a pressure of 1 bar.

The frequency of collisions between gas molecules is proportional to pressure. Therefore, an elevation of pressure will speed up the time base for gaseous phase reactions. For a given temperature, 1 second spent at a pressure of 1 bar is equivalent to 0.5 seconds spent at 2 bars, or 0.1 seconds spent at 10 bars, and so on. Curves 702 and 704 are shifted toward the left in graph 700 by one decade per factor of 10 of increase in the pressure above 1 bar, while maintaining the same separation and shape. Residence time is also proportional to pressure for a given set of dimensions and mass throughput. Reactions are faster at elevated pressures, and more time is allowed for reactions at elevated pressures.

A temperature higher than about 1460° C. is appropriate for fully decomposing ammonia non-catalytically in 1 second or less at a pressure of 1 bar. A temperature range of about 1560-1770° C. is appropriate for decomposing ammonia in 0.001-0.1 seconds at a pressure of 1 bar. A temperature range of about 1380-1560° C. is appropriate for decomposing ammonia in 0.01-1 seconds at a pressure of 10 bars. A temperature range of about 1230-1380° C. is appropriate for decomposing ammonia in 0.1-10 seconds at a pressure of 100 bars. These temperature ranges are higher than 1400° C., or higher than 1300° C. at a gas pressure of 10 bars, which is within a pressure range of higher than 1 bar, or higher than 1200° C. at a gas pressure of 100 bars, which is within a pressure range of higher than 10 bars. Most generally, temperatures higher than 1200° C. are required for non-catalyzed decomposition of ammonia at useful combinations of residence time and pressure.

In previous development work, a heat exchanged, autothermal ammonia cracker was described, which preheats a rich, homogeneous mixture of ammonia and air to ignition in the total absence of catalytic activity within the incoming gas flow channels. The homogeneous mixture does not accept preheating beyond ignition, because the mixture soars in temperature when it ignites. The maximum achievable preheat energy state thus corresponds to a preheating of the mixture to the ignition temperature 702. If the ignition time and the holding time at peak temperature are about the same, then the full ammonia decomposition temperature 704 is about 320° C. higher than the ignition temperature 702, for a wide range of times and pressures. The full ammonia decomposition temperature 704 can be made equal to the ignition temperature 702 only by making the holding time at peak temperature about 400-1000 times longer than the residence time taken by the incoming gas per 50 degree C. rise near the hot end of the heat exchanger, which is burdensome from the standpoint of design. Furthermore, if the incoming gas flow channels become contaminated with a catalyst, then the mixture will ignite before reaching the non-catalyzed ignition temperature 702. Therefore, the preheat temperature does not closely approach the full ammonia decomposition temperature 704, and the theoretical limit, corresponding to an equivalence ratio of 6.66, is not closely approached.

Figure 8:
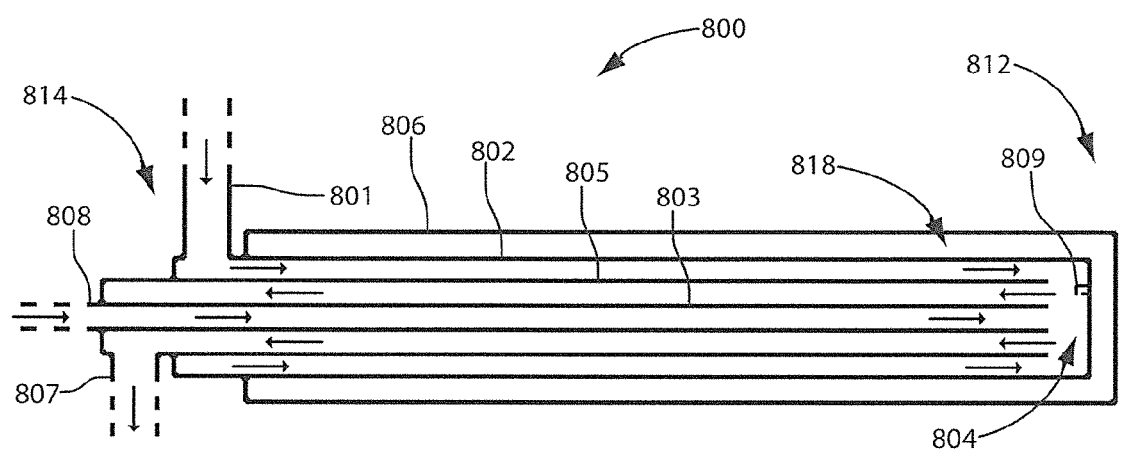
FIG. 8 is a schematic diagram of an autothermal ammonia cracker, constructed in accordance with the invention.

FIG. 8 illustrates an autothermal ammonia cracker 800, which addresses the above preheating limitation by separately preheating the ammonia and air before combustion. Separate preheating prevents ignition of the ammonia and air until they are combined, regardless of the presence or absence of catalytic activity in any region. Hence, the autothermal ammonia cracker 800 is not adversely affected by catalytic activity, and the autothermal ammonia cracker 800 achieves a high preheat energy state that is not limited by ignition.

The autothermal ammonia cracker 800 includes concentric, round tubes 802, 803, 805, and 806, and an igniter 809. The igniter 809 may be a spark gap, a traveling flame, or any of the various other igniters which are known to the art. The igniter 809 may be used for igniting a flammable starting mixture at startup. Within a starting period, a starting mixture may be combusted in region 804, and the combusted gases are purged through from an operationally relatively hot end 812 toward an operationally relatively cool end 814, thereby heating surfaces within the autothermal ammonia cracker 800 up to a suitable range of operating temperatures. In some cases, leftover hydrogen in this combusted starting mixture is directed to further uses within the starting period.

The tubes 802 and 805, and 805 and 803 are joined near cool end 814, and these tubes form a counterflow heat exchanger, wherein two separate streams of incoming gas are heat exchanged with one stream of outgoing gas. Ammonia enters the heat exchanger through inlet 801, and travels through the space between tubes 802 and 805 until the ammonia arrives at region 804. The space between tubes 802 and 805 is an incoming flow channel for flowing ammonia from inlet 801 to region 804. Air enters through inlet 808, and travels through the space within tube 803 until the air arrives at region 804. The space within tube 803 is an incoming flow channel for flowing air from inlet 808 to region 804.

Region 804 is a turnaround region and also a combustor, into which the ammonia and air are separately flowed. A "turnaround region" is an innermost limit of gas travel within the heat exchanger, in which the gas reverses its direction of travel. A "combustor" is a mixing region within the heat exchanger, in which the ammonia initially contacts the air. The combustor and turnaround region may be the same, or the combustor may be adjacent to and slightly upstream of the turnaround region. The terms "upstream" and "downstream" refer herein to relative positions in gas flow.

The ammonia and air are combined and combusted within or downstream of the combustor 804. Gas temperatures that are higher than 1400° C., or higher than 1300° C. at a gas pressure higher than 1 bar, or higher than 1200° C. at a gas pressure higher than 10 bars may be attained by the combusting gases, thereby decomposing ammonia molecules, possibly without the aid of a catalyst. An exhaust gas containing hydrogen is thereby formed from all of the ammonia and from all of the air. This exhaust gas is referred to hereafter as a hydrogen-containing gas mixture for the discussion of autothermal ammonia cracker 800. Ammonia decomposition occurs together with burning of hydrogen or ammonia within the same stream of gas. Once started, the overall reaction proceeds without an external input of energy; hence the reaction is autothermal. Finally, the hydrogen-containing gas mixture travels toward outlet 807, through the space between tubes 805 and 803, and leaves the heat exchanger through outlet 807. The space between tubes 805 and 803 is an outgoing flow channel for flowing the hydrogen-containing gas mixture to the outlet 807. The small arrows indicate the direction of flow.

The ammonia is preheated while flowing from inlet 801 to combustor 804 and the hydrogen-containing gas mixture is cooled while flowing from combustor 804 to outlet 807, by heat conduction and/or radiation through the walls of tube 805. The air is preheated while flowing from inlet 808 to combustor 804 and the hydrogen-containing gas mixture is cooled while flowing from combustor 804 to outlet 807, by heat conduction and/or radiation through the walls of tube 803. It is through these heat exchange processes, that the ammonia and air are preheated before they react within or downstream of the combustor 804 and become the hydrogen-containing gas mixture. The outgoing hydrogen-containing gas mixture is cooled by giving up a substantial portion of its sensible heat to the next equal mass of incoming ammonia and air. The hydrogen-containing gas mixture is thereby cooled in conjunction with the preheating of the next incoming ammonia and also in conjunction with the preheating of the next incoming air.

At least the ammonia must be preheated in order to obtain a reasonably efficient autothermal recovery of hydrogen from the ammonia. However, no effort is made to prevent or impede preheating of the air. Preheating of the air comprises any substantial increase of the temperature of the air as the air travels within an incoming flow channel. Accordingly, preheating of the air cannot ordinarily be avoided without implementation of unusual methods, incurring additional expense, and also incurring a significant efficiency penalty. For all discussion herein pertaining to the autothermal ammonia cracker 800, both the ammonia and the air are preheated, and the preheat temperatures are assumed to be the same, although in practice the preheat temperatures may differ slightly or substantially.

The ammonia, entering inlet 801, is substantially devoid of molecular oxygen. That is, no effort is made to include oxygen, air, or any other oxidizer in the ammonia, although the ammonia may contain small quantities of substantially inert oxygen-bearing impurities such as water or carbon dioxide, which do not normally support combustion of ammonia. The air, entering inlet 808, is substantially devoid of ammonia. That is, no effort is made to include ammonia or any other fuel in the air. Neither the ammonia nor the air can ignite until the two are combined in the combustor 804. Therefore, the total preheat energy state of the separate reactants is not limited by ignition.

Some of the ammonia may decompose within preheating, before arrival at the combustor 804, and the preheat temperatures may be somewhat lower than the full ammonia decomposition temperature 704. If enough ammonia is decomposed within preheating, then such a preheat state can be energetically equivalent to preheating to the full ammonia decomposition temperature 704, and the theoretical limit, corresponding to an equivalence ratio of 6.66, may be closely approached. In the case that some or all of the ammonia is decomposed within the preheating step, the decomposed mixture retains its label as the "ammonia" until it is combined with the air or other "oxygen-containing gas mixture" in the combustor 804 for the discussion of autothermal ammonia cracker 800.

The combusting gases undergo an additional 7° C. temperature rise above the preheat temperature, for every additional 1 percent of the ammonia that is decomposed within preheating. Partially or fully decomposed ammonia combusts at a peak gas temperature that is higher than the preheat temperature, even if the overall reaction is balanced for zero temperature rise. The energy that is associated with this additional temperature rise is recovered in a same partial decomposition of the next mass of incoming ammonia. A substantial fraction, perhaps about ¼ to ⅓ or more of the ammonia, may readily be decomposed, before arrival at the combustor 804, thus resulting in a temperature rise of about 200° C. above the preheat temperature, when the air reacts with the partially decomposed ammonia. The preheat temperature may be limited by the maximum temperature that can be tolerated by materials, for example, about 1700° C. for aluminum oxide. In one example, the 200° C. temperature rise above the 1700° C. preheat temperature produces a peak gas temperature of 1900° C. Peak gas temperatures, possibly exceeding material durability limits, can thereby be achieved by the autothermal ammonia cracker 800.

In one example, a fully non-catalytic embodiment of autothermal ammonia cracker 800 is used. In some cases, a fully non-catalytic structure is preferred, because a catalyst that is provided within, or that migrates to, an outgoing flow channel could cause hydrogen and nitrogen to recombine back into ammonia at high pressures. The ammonia and air are preheated up to or beyond the ignition temperature 702 in the absence of catalytic activity before arriving at the combustor 804. A portion of the ammonia may decompose before arrival at the combustor 804. The ammonia is combusted non-catalytically within or downstream of the combustor 804, at a gas temperature that is most generally higher than 1200° C., depending on choice of pressure and residence time. The resulting hydrogen-containing gas mixture is then cooled downstream of the combustor 804, in conjunction with the preheating of the next ammonia and air.

In another example, sufficient catalytic structure is provided for reducing the quantity of intact ammonia molecules by a factor of e before arrival at the combustor 804. About 63.2 percent of the ammonia is decomposed on a catalyst within the preheating step, and the ammonia and air reach a preheat temperature of 1300° C., before arrival at the combustor 804. The combusting gases undergo a temperature rise of 400° C. above the preheat temperature, achieving a flame temperature of 1700° C., thereby non-catalytically decomposing the remainder of the ammonia. The rate of catalysis is usually limited by diffusion of ammonia molecules from the bulk gas to the catalyst surface, and the quantity of intact ammonia molecules decays exponentially in time. Without non-catalyzed decomposition of the remainder of the ammonia at a high temperature, 9.21 times as much of a similar catalytic structure, and a correspondingly larger mass of catalyst, would have to be provided in order to reach a final ammonia decomposition of 99.99 percent.

In yet another example, 99.99 percent of the ammonia is decomposed catalytically before reaching the combustor 804, within the combustor 804, or after leaving the combustor 804, or through a combination of any two or all three. The ammonia is combusted within or downstream of the combustor 804 at an unspecified temperature and pressure, thereby providing heat for decomposing ammonia. Even in the field of fully catalyzed ammonia crackers, the structure 800 is uniquely useful for achieving a high preheat energy state, because the separate flowing and separate preheating, of the ammonia and air, prevents the ammonia from igniting until the ammonia contacts the air in the combustor 804.

Means of monitoring one or more temperatures and means for feedback control of the equivalence ratio may be provided for the purposes of maintaining thermal stability, to avoid passage of ammonia through the outlet 807, and to maintain a desired set of operating temperatures. A temperature sensor monitors a temperature near hot end 812. Such a temperature sensor may be a thermal radiation detector that monitors a temperature of a surface or gas near the hot end 812 through a sight tube. The thermal radiation detector itself need not be positioned within the hot end 812.

A target temperature may be chosen, such that no ammonia passes through the outlet 807 when the monitored temperature is maintained within a temperature range that is near the target temperature. The ammonia/air equivalence ratio may be adjusted in response to the monitored temperature, such that if the monitored temperature is slightly lower than a target temperature, then the equivalence ratio is decreased, and vice versa.

Tube 806 is joined to tube 802 near cool end 814. Tube 806 forms the outer wall of a vacuum jacket and tube 802 forms the inner wall of this same vacuum jacket. This vacuum jacket reduces heat loss from the heat exchanger. A vacuum space 818 is bounded by the inner surface of tube 806 and the outer surface of tube 802. The vacuum space 818 prevents conductive and convective heat loss from tube 802. A getter may be provided for maintaining the "hardness" of the vacuum against outgassing of components within or bordering the vacuum space 818. The inner surface of tube 806 may be coated with a metal film, for example gold, silver, copper or aluminum, which has a high average reflectivity for blackbody radiation at 1400° C. The high reflectivity coating on the inner surface of tube 806 reduces radiative heat loss from tube 802, and also serves to keep tube 806 relatively cool. The outer surface of tube 802 may also be constructed of, or coated or covered with possibly reflective or translucent materials that have a very low vapor pressure at 1400° C., thereby minimizing contamination of the vacuum space 818, and minimizing contamination of any reflective coatings. A broadband multilayer dielectric reflector may be applied to the outer surface of tube 802, the inner surface of tube 806, or placed within the vacuum space 818 between tubes 802 and 806, possibly in combination with a metal film on the inner surface of tube 806. Further insulation on the outside of tube 806 only serves to raise the temperature of tube 806, and has minimal impact on the rate of net heat loss from tube 802.

A heat exchanger design, possibly differing from the particular example shown in autothermal ammonia cracker 800, may be chosen for the purposes of improving the rate of heat exchange and to impede heat loss. Multiple parallel sets of channels may be housed within a single heat exchanger. For example, a heat exchanger monolith with hollow channels, each of which is about a few millimeters wide, may be used instead of the single tube arrangement comprising tubes 803 and 805. Such a monolith may contain, for example, an N by N array of square channels, housed within tube 802. Channels are divided into 3 groups comprising incoming ammonia flow channels, incoming air flow channels, and outgoing hydrogen flow channels, separately connecting, one group each, to respective inlets 801 and 808, and outlet 807 of autothermal ammonia cracker 800. The channel grouping pattern may be chosen to promote mixing of the ammonia and air in the combustor 804, and also to promote exchange of heat. Portions of the monolith may be coated with a catalyst such as nickel, nickel oxide, a platinum-group metal or the like.

Incoming channel ends, near end 812, may be offset lengthwise from outgoing channel ends. For example, incoming channels may protrude further into region 804 than do the outgoing channels near hot end 812, by a distance that is appropriate for uniform mixing of the ammonia and air prior to entry of the combusting gases into the outgoing channels. In another example, groups of adjacent incoming ammonia and air channel ends may be recessed into the face of the monolith near hot end 812, by a distance that is appropriate for mixing. This mixing distance may typically be about 5-10 percent of the total length of the monolith. These channel offset regions fall under the scope of "combustor".

Components may have a layered, segmented, or graded composition that varies down the length. For example, flow channels may be composed of predominantly aluminum oxide or silicon carbide near hot end 812, and mullite near cool end 814. Such a grading may include variable doping of a semiconductor heat exchanger monolith, of which silicon carbide is an example, from which the monolith may be constructed. Variable doping can be used for obtaining a desired electrically conductive path, thereby providing a structure that permits starting by resistive heating. In one example, an electric current is passed through contacts brazed onto the monolith near cool end 814, and the current is conducted down the length through a pair of highly conductive doped electrical channels in the monolith, toward a moderately conductive doped electrical bridge connecting the two highly conductive channels near hot end 812, the remainder of the monolith being substantially electrically insulating. An electric current is passed through a portion of the heat exchanger monolith, thereby resistively heating a portion of the heat exchanger up to a suitable operating temperature within a starting period. If a portion of the monolith is catalytic, or if a portion of the monolith is resistively heated to a temperature that is higher than the ignition temperature 702, then igniter 809 may be omitted.

A combustor design, differing from the particular example shown in 804, may be chosen for the purpose of moderating the combustion of the ammonia with the air. The air may be combined with the ammonia in a lengthwise-distributed manner. In one example, after the ammonia and air are separately preheated, the flowing ammonia encounters a series of air jets fed by an adjacent air channel. The air jets are separated lengthwise by spaces, and these spaces may contain or be coated with a catalyst. Such an arrangement produces either a saw-tooth temperature profile if a catalyst is used or a gradual ramp temperature profile if no catalyst is used. Temperature soaring is thereby mitigated by gradually combining the ammonia and air. The air jets may be divided into separate sets, connecting one set each, to separate air inlets, such that the distribution of air can be controlled by controlling the passage of air into the separate air inlets. Otherwise, the sizes of the air jets may be chosen such that a desired distribution of air is obtained. These arrangements also fall under the scope of "combustor". A plurality of inlets falls under the scope of "an inlet", because a plurality of inlets comprises an inlet. Similarly, a plurality of outlets falls under the scope of "an outlet".

The autothermal ammonia cracker 800 can be warmed up to a suitable operating temperature by combustion of a starting mixture and then flowing the combusted starting mixture through the autothermal ammonia cracker 800, such that the combusted starting mixture thermally contacts the heat exchanger within a starting period. A "starting period" is a time interval, in conjunction with which, starting methods or starting apparatus are used for heating at least a portion of an autothermal ammonia cracker up to an appropriate operating temperature.

The starting mixture comprises a fuel component and an oxidizer component. The fuel and oxidizer components of the starting mixture are flowed separately into inlets 801 and 808, respectively. The separate flowing of the fuel and oxidizer components of the starting mixture prevent them from igniting until they are combined in the combustor 804. The starting mixture is ignited by the igniter 809 and combusted within or downstream of the combustor 804. The combusted starting mixture is flowed from the combustor 804 toward outlet 807.

Mixtures of ammonia and purified oxygen are flammable at a wide range of temperatures, and thus can be used as starting mixtures. In that case, the fuel component of the starting mixture is ammonia, and the oxidizer component is either purified oxygen, or a combination of purified oxygen and air. Purified oxygen can be used for rendering flammable, a comparatively larger mass of starting mixture comprising mostly ammonia and air. Purified oxygen may be obtained by pressure swing adsorption, or by any other means known to the art for extracting partially or fully purified oxygen from air. An autothermal ammonia cracker can thereby be started, using ammonia, air, and purified oxygen.

As the surface temperatures increase within the starting period, the preheat temperatures of the starting mixture will also increase, and it is permitted to do one or more of the following: increase the total flow of the starting mixture, decrease the oxygen fraction of the oxidizer component, or increase the overall richness of the starting mixture. Any of these may be achieved by holding the flow of purified oxygen constant, and increasing the ammonia flow, while possibly also increasing the air flow, to the extent permitted by the increasing surface temperatures. In each case, the ammonia flow may optionally be increased within the starting period. An autothermal ammonia cracker can thereby be quickly started even on a comparatively small flow of purified oxygen. The flow of purified oxygen is turned off at or near the end of the starting period.

An oxygen extractor that provides purified oxygen for starting may be more burdensome or expensive than is an ammonia decomposer that provides hydrogen for starting. Hydrogen can be used for rendering flammable, a comparatively larger mass of starting mixture comprising mostly ammonia and air. In that case, the fuel component of the starting mixture is either hydrogen, or a combination of ammonia and hydrogen, and the oxidizer component is air.

The ammonia decomposer that provides hydrogen for starting may be selected from any of the ammonia decomposers disclosed herein or known to the art. The ammonia decomposer that provides hydrogen for starting could be a smaller autothermal ammonia cracker 800, which itself must be started. Hence, in an absurd scenario, an infinite starting series of ever-smaller and fully non-electric autothermal ammonia crackers is incorporated into a starting strategy. The starting series can be truncated, perhaps to only one ammonia cracker that provides hydrogen for starting, by including, within the starting series, an ammonia cracker that accepts electricity as at least an initial or partial energy input.

An exclusively electrically powered ammonia decomposer may be used for providing hydrogen for starting, if it is desired to obtain a maximally flammable starting mixture, which is devoid of water vapor, and is of minimal inert gas content. An exclusively electrically powered and possibly heat exchanged ammonia decomposer may contain a resistively heated, catalytic electric heating element, which is immersed in flowing ammonia. An autothermal ammonia cracker can thereby be started, using ammonia, air and a relatively small quantity of electrical energy as the only inputs.

In one example, a near-stoichiometric starting mixture comprising air and ¼ decomposed ammonia is flammable at a wide range of temperatures. As the surface temperatures increase within the starting period, the preheat temperatures of the starting mixture will also increase, and it is permitted to do one or more of the following: increase the total flow of the starting mixture, increase the ratio of ammonia to hydrogen in the starting mixture, or increase the overall richness of the starting mixture. Any of these may be achieved by holding the hydrogen flow constant, and increasing the ammonia flow, while possibly also increasing the air flow, to the extent permitted by the increasing surface temperatures. In each case, the ammonia flow may optionally be increased within the starting period. An autothermal ammonia cracker can thereby be quickly started even on a small flow of hydrogen and a correspondingly small consumption of electric power by the ammonia decomposer that provides the hydrogen for starting.

The flow of hydrogen is turned off at or near the end of the starting period. After starting, autothermal ammonia cracker 800 can revert to operation on ammonia and air as the only substantial inputs.

Figure 9:
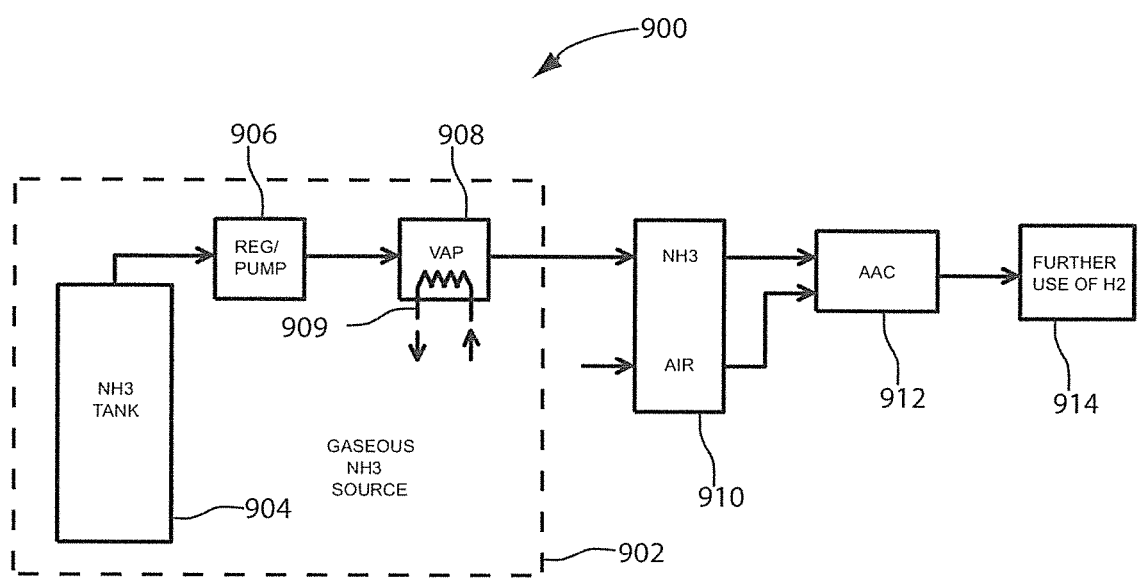
FIG. 9 is a schematic diagram of a basic system for converting ammonia into hydrogen, which is then directed to further uses.

FIG. 9 illustrates a basic system 900 for operating an autothermal ammonia cracker 912. The autothermal ammonia cracker 912 may be the autothermal ammonia cracker 800 or any other ammonia crackers disclosed herein or disclosed in any publication that is incorporated herein by reference, wherein ammonia and air enter various inlets and hydrogen exits an outlet as described, possibly including starting and control apparatus and methods also described.

The system 900 incorporates a source of gaseous ammonia 902 comprising a tank of ammonia 904, ammonia vaporizer 908, and a pump and/or pressure regulator 906, which regulates the pressure of the ammonia in vaporizer 908 and/or entering the flow control module 910. If regulator 906 includes a pump, then the source of gaseous ammonia 902 may build a pressure that is higher than the pressure in the ammonia tank 904. Pressurized gaseous ammonia may be obtained by pressurizing the liquid with a pump 906 and then vaporizing the ammonia at an elevated temperature in the vaporizer 908, for example higher than 90° C. for a pressure of 50 bars, or higher than 130° C. for a pressure of 100 bars. Engine coolant, engine exhaust, output from the autothermal ammonia cracker 912, another hot or warm fluid, or an electric current may be circulated through the heating loop 909 of the ammonia vaporizer 908, thereby heating the ammonia vaporizer 908.

The flow control module 910 may comprise combinations of pumps, compressors, expanders, regulators, sensors, actuators, processors programmed with algorithms, throttles or valves which are known to the art, and it controls the flows of air and ammonia into the autothermal ammonia cracker 912. Components of the flow control module 910 may be distributed over different locations. The flow control module 910 may be incorporated into the source of gaseous ammonia 902. In all cases, the autothermal ammonia cracker 912 receives gaseous ammonia originating from the source of gaseous ammonia 902.

Ammonia is fully vaporized before entering the flow control module 910 or autothermal ammonia cracker 912. Any liquid ammonia entering the flow control module 910 or autothermal ammonia cracker 912 could surge in response to variations in pressure or temperature, causing the instantaneous flow of ammonia to vary in an unknown or uncontrolled manner. Therefore, a combination of output pressure and temperature of the ammonia source 902 is controlled such that substantially gaseous ammonia is supplied to the flow control module 910, which then supplies the gaseous ammonia to the autothermal ammonia cracker 912.

The vaporizer 908 may be omitted if ammonia is drawn from the tank 904 as a gas. In some cases, the regulator/pump 906 may be omitted. The ammonia tank 904 may contain liquid anhydrous ammonia, which may be drawn from the tank 904 as either a liquid or a gas.

The vaporizer 908 may be inoperative at startup if the vaporizer 908 is cold. This problem may be solved by drawing ammonia from the tank 904 as a gas within a vaporizer warm-up period, and then reverting to drawing ammonia from the tank 904 as a liquid after the vaporizer 908 has warmed up to a suitable operating temperature. Through an appropriate choice of design parameters and other provisions, the thermal mass of the ammonia in the tank 904 can be relied upon to provide enough heat to vaporize ammonia within the vaporizer warm-up period. One such provision may include a warning signal prompting the user to refill the ammonia tank 904 before the quantity of ammonia drops to a level that is insufficient for providing enough gaseous ammonia for the next start.

An electric heater may be provided for maintaining the temperature of the tank 904 above the boiling temperature of ammonia at ambient pressure, in extremely cold ambient conditions. The tank 904 may be covered with an insulating layer, thereby minimizing the power required for maintaining a particular temperature of tank 904. The vaporizer 908 may be heated electrically to a suitable operating temperature before starting of the system 900. Similar temperature control methods may be applied to the flow control module 910, flow lines, or other components.

The ammonia tank 904 may contain aqueous ammonia, which possibly also includes an antifreeze component, in which case the ammonia is drawn from the tank 904 as a gas, possibly at a pressure of less than 1 bar. A pump 906 may then raise the pressure of the gaseous ammonia to a pressure that is greater than or equal to the ambient pressure.

Figure 10:
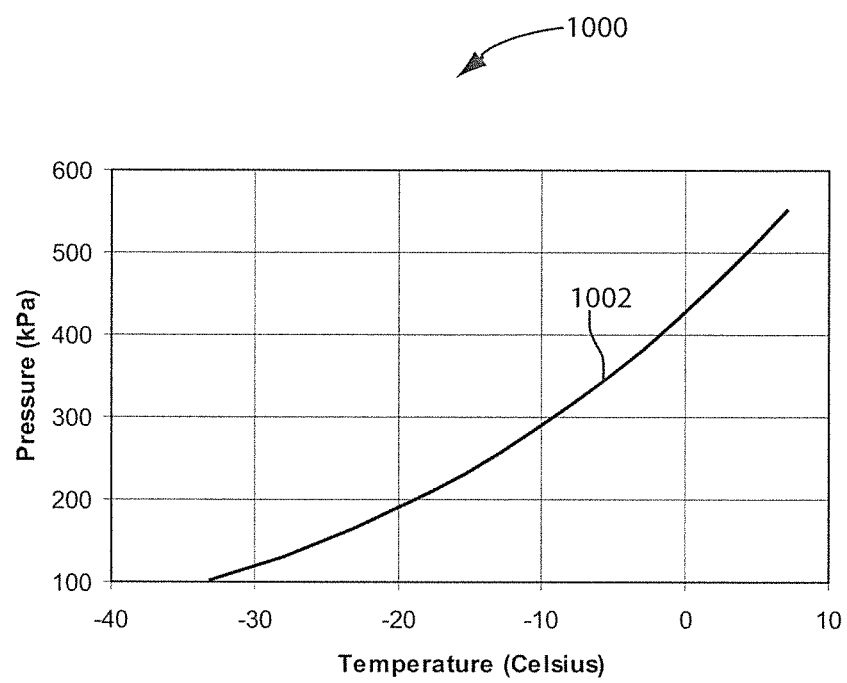
FIG. 10 is a graph of the vapor pressure of ammonia, as a function of temperature.

FIG. 10 illustrates a graph 1000 depicting the vapor pressure of ammonia 1002. The pressure of the ammonia exiting the source of gaseous ammonia 902 is limited by the vapor pressure of ammonia at a given exit temperature. If it is desired to operate the source of gaseous ammonia 902 at an output pressure of 200 kPa, for example, then the temperature of the gaseous ammonia, exiting the source of gaseous ammonia 902, must be higher than −19° C., according to curve 1002.

Figure 11:
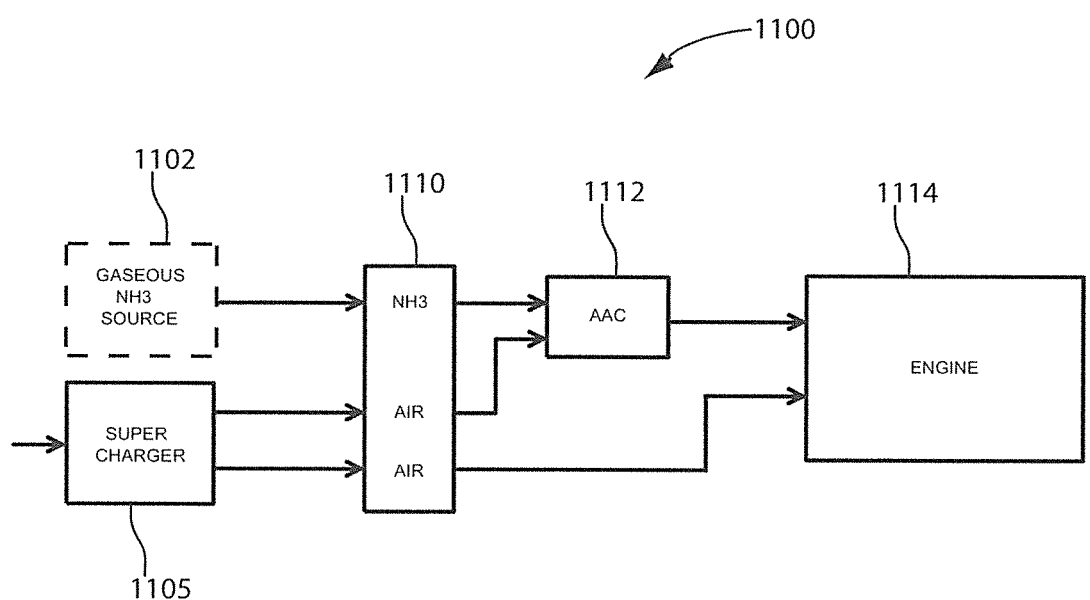
FIG. 11 is a schematic diagram of a supercharged engine system.

FIG. 11 illustrates a supercharged engine system 1100. The system 1100 is a more specific case of the system 900, wherein the engine 1114 is one particular example of a further use 914 of the hydrogen. The engine system 1100 can be operated at efficiencies that are comparable to those achieved by a system incorporating a fuel cell. However, the engine system 1100 does not waste or feed back a portion of the hydrogen as an "anode off-gas", as is done in a system incorporating a fuel cell, and the engine 1114 does not require a large quantity of expensive catalyst for combusting the substantial bulk of the hydrogen or other fuel.

A supercharger 1105 supplies air at a possibly elevated pressure to the flow control module 1110, which controls the flows of ammonia and air entering the autothermal ammonia cracker 1112, which is the same as autothermal ammonia cracker 912. The flow control module 1110 also controls the overall stoichiometry of the hydrogen-containing gas mixture and air entering the engine 1114. The flow control module 1110 is supplied with gaseous ammonia from the gaseous ammonia source 1102, which is the same as gaseous ammonia source 902. The autothermal ammonia cracker 1112 operates at substantially the same, possibly elevated pressure of the air, entering the engine 1114.

The system 1100 represents a specific case, in which the autothermal ammonia cracker 1112 is operated at a pressure that is possibly higher than 1 bar, in this case, for the purpose of appropriately matching input and output pressures. The engine 1114 may be the High Efficiency, Drafted Fuel Engine disclosed in U.S. patent application Ser. No. 13/769,497, filed Feb. 18, 2013, or the High Efficiency, Ternary Mix Engine disclosed in U.S. patent application Ser. No. 14/069,793, filed Nov. 1, 2013, the entire content of both incorporated herein by reference. The hydrogen may be drafted, or the hydrogen may be direct injected according to the discussion of FIG. 7 of U.S. patent application Ser. No. 14/069,793. Those skilled in the art will recognize an appropriate choice of design parameters for the engine 1114 combusting flammable mixtures comprising hydrogen possibly including other fuels, inert gas possibly including pressurized steam, and air possibly enriched with supplemental or pressurized oxygen.

Figure 12:
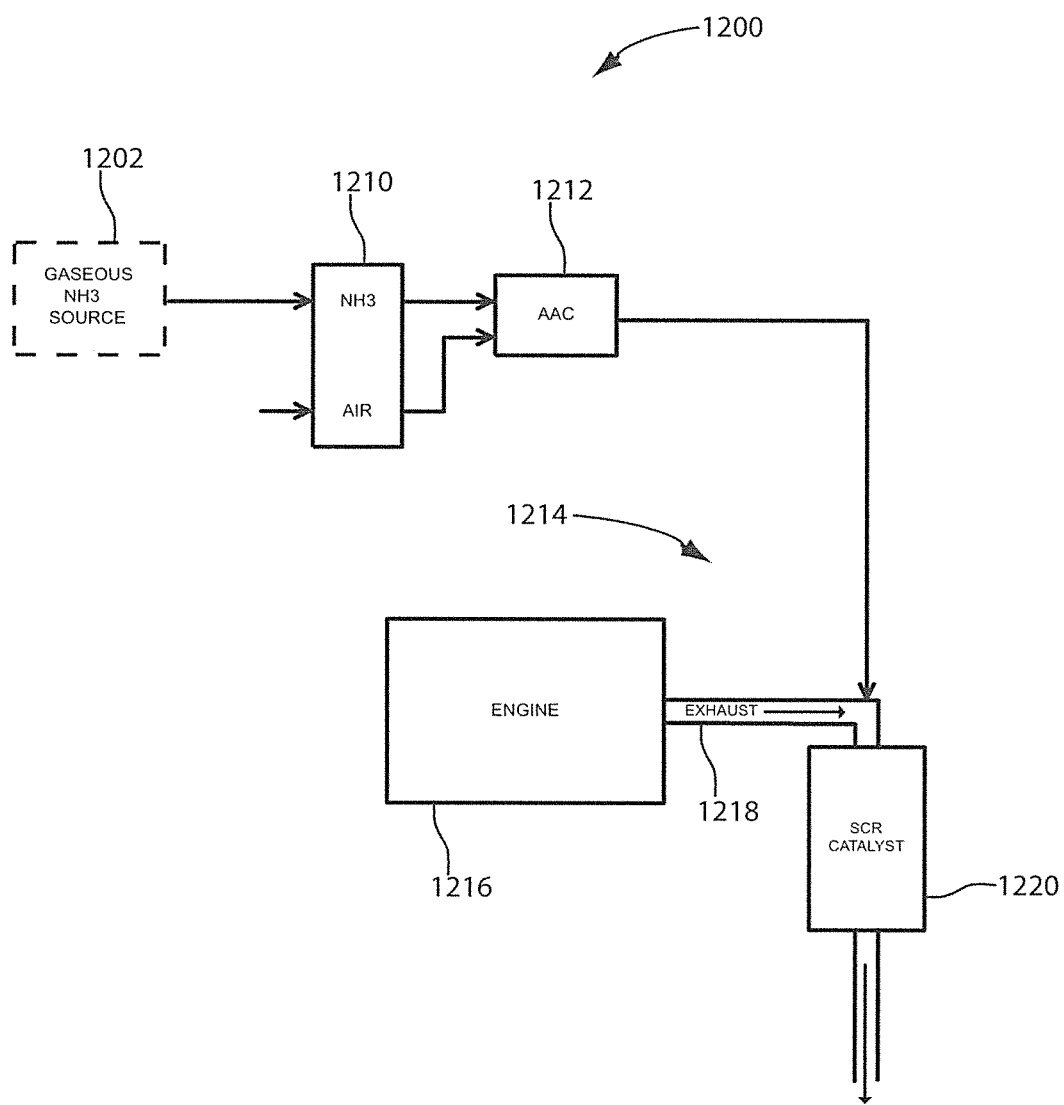
FIG. 12 is a schematic diagram of a system that supplies hydrogen to an SCR.

FIG. 12 illustrates a hydrogen SCR (Selective Catalytic Reduction) system 1200. The system 1200 is another specific case of the system 900, wherein the exhaust system 1214 is merely another further use 914 of the hydrogen. A flow control module 1210 controls the flows of ammonia and air into the autothermal ammonia cracker 1212. The autothermal ammonia cracker 1212 is the same as autothermal ammonia cracker 912. The flow control module 1210 is supplied with gaseous ammonia from the gaseous ammonia source 1202, which is the same as gaseous ammonia source 902.

Cleanup of NOx (nitric oxide, possibly also containing nitrogen dioxide) is achieved by the hydrogen exiting the autothermal ammonia cracker 1212 and entering the exhaust pipe 1218 of the exhaust system 1214. The hydrogen reduces the NOx to nitrogen on the SCR catalyst 1220; hence the hydrogen or other fuel is referred to herein and throughout the literature as a "reductant" in this or similar applications. The engine 1216 may be a diesel engine that incorporates a particulate trap, which may also remove hydrocarbons and carbon monoxide from the exhaust.

The hydrogen SCR system 1200 differs from conventional ammonia/urea SCR systems, in that an excess of the hydrogen reductant can be delivered into the exhaust pipe 1218, thereby completely reducing NOx to nitrogen in the exhaust system 1214, without causing excessive passage of ammonia through the SCR catalyst 1220. If a conventional ammonia/urea SCR system delivers an excess of ammonia reductant to an SCR catalyst, as intended to reduce all of the NOx to nitrogen, then a significant quantity of ammonia passes through the SCR catalyst. Conventional ammonia/urea SCR systems may operate at a deficit of ammonia reductant, as intended to avoid passage of ammonia through the SCR catalyst, but in doing so, they fail to fully reduce the NOx to nitrogen. Therefore, system 1200 can substantially eliminate both NOx and ammonia emissions simultaneously, whereas conventional ammonia/urea SCR systems cannot.

Hydrogen SCR systems, and various SCR catalysts, including hydrogen SCR catalysts, are known to the art. For more information about hydrogen SCR, see the paper, titled "Low Temperature Hydrogen Selective Catalytic Reduction of NO on Pd/Al$_2$O$_3$", received Nov. 5, 2010, published in Revue Roumaine de Chimie, and authored by Mihet, et al. The hydrogen SCR system 1200 differs from conventional hydrogen SCR systems, in that the reductant is stored as ammonia, which is then decomposed in an autothermal ammonia cracker 1212, thereby producing the hydrogen on demand. In conventional hydrogen SCR systems, such as the one disclosed in U.S. Pat. No. 7,357,900, the hydrogen is obtained inefficiently by reforming diesel fuel. Otherwise, the hydrogen is stored as either a cryogenic liquid or as a high pressure gas. Hydrogen forms explosive mixtures with air that are easily ignited, whereas ammonia can be stored indefinitely at ambient temperatures as a moderate pressure liquid, and ammonia is not easily ignited in air.

Up to this point the description has been mostly directed to various aspects of the autothermal ammonia cracker 800. However, other useful embodiments are envisioned, which may incorporate methods involving novel temperature ranges or novel combinations of temperature and pressure, as does also the autothermal ammonia cracker 800.

Figure 13:
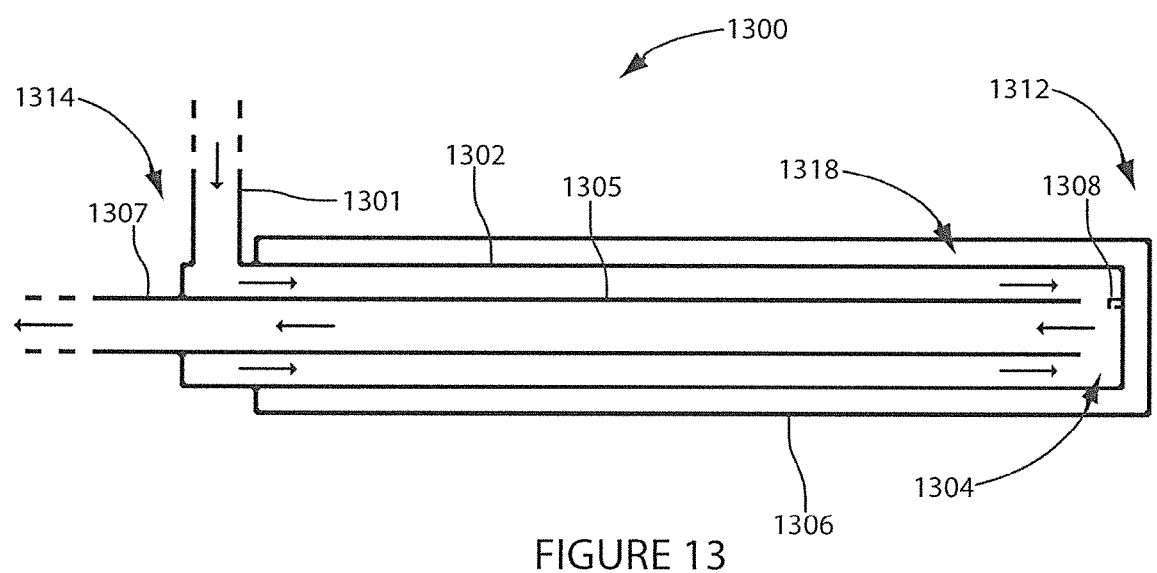
FIG. 13 is a schematic diagram of an autothermal ammonia cracker, constructed in accordance with the invention.

FIG. 13 illustrates a premixed autothermal ammonia cracker 1300 embodiment including concentric, round tubes 1302, 1305, and 1306, and an igniter 1308. The igniter 1308 is used for igniting a flammable mixture at startup. Tubes 1302 and 1305 are joined near the cool end 1314, and these tubes form a counterflow heat exchanger, in which one incoming gas mixture is heat exchanged with one outgoing gas mixture. This heat exchanger may similarly be expanded into multiple parallel sets of channels housed within a single heat exchanger as with a monolith or the like. The incoming gases reverse their direction of travel in the turnaround region 1304 within tube 1302 near the hot end 1312.

A rich mixture of ammonia and air enters through inlet 1301, and travels through the space between tubes 1302 and 1305, toward the turnaround region 1304. The space between tubes 1302 and 1305 is an incoming flow channel for flowing a gaseous mixture from the inlet 1301 to the turnaround region 1304. The mixture of ammonia and air is preheated to ignition by the heat exchanger by heat conduction and/or radiation through the walls of tube 1305. The mixture of ammonia and air ignites upon reaching the ignition temperature 702 somewhere within the space between tubes 1302 and 1305, upstream of the turnaround region 1304. The ignition time is the time taken for a 50° C. rise near the hot end 1312 of the heat exchanger.

The ignited mixture combusts, thereby forming a hydrogen-containing gas mixture from the ammonia and air. A gas temperature that is higher than 1400° C., or higher than 1300° C. at a gas pressure higher than 1 bar, or higher than 1200° C. at a gas pressure higher than 10 bars is attained by the combusting gases, thereby non-catalytically decomposing ammonia molecules. Ammonia decomposition occurs together with burning of hydrogen or ammonia within the same stream of gas. At least the surfaces contacting the incoming mixture, in the space between tubes 1302 and 1305, are selected or treated to be non-catalytic at least up to the point of ignition, thus preventing the mixture of ammonia and air from igniting before it is preheated to the highest possible preheat energy state.

The hydrogen-containing gas mixture travels toward outlet 1307, through the space inside tube 1305. The space inside tube 1305 is an outgoing flow channel for flowing a gaseous mixture from the turnaround region 1304 to the outlet 1307. The outgoing hydrogen-containing gas mixture is cooled by the heat exchanger by heat conduction and/or radiation through the walls of tube 1305, in conjunction with the preheating of the next incoming mixture of ammonia and air. Finally, the hydrogen-containing gas mixture leaves the heat exchanger through outlet 1307. The small arrows indicate the direction of flow.

Tube 1306, joined to tube 1302 near cool end 1314, forms the outer wall of a vacuum jacket, and tube 1302 forms the inner wall of this same vacuum jacket. This vacuum jacket prevents heat loss from the heat exchanger. A vacuum space 1318 is bounded by the inner surface of tube 1306 and the outer surface of tube 1302. Reflective coatings and other features are similar to those used with vacuum space 818.

The autothermal ammonia cracker 1300 is inherently stable in its operation, because the mixture of ammonia and air, entering inlet 1301, ignites and combusts when it reaches the ignition temperature 702, and thus does not accept preheating beyond the ignition temperature 702. Operation is thus not subject to thermal runaway. However, the full ammonia decomposition temperature 704 is about 320° C. higher than the ignition temperature 702 for a broad range of times and pressures. This is shown by the vertical displacement of curve 704 above curve 702. This temperature difference can be compensated by using a reduced equivalence ratio, such that the mixture of ammonia and air undergoes the required temperature rise upon ignition. The theoretical limit, corresponding to an equivalence ratio of 6.66, is not closely approached, and the hydrogen-containing gas mixture exits the outlet 1307 at a substantially elevated temperature. Despite this limitation, autothermal ammonia cracker 1300 can be usefully incorporated into systems in which the sensible heat and chemical energy, of the hydrogen-containing gas mixture exiting the outlet 1307, have equal value, such as a barbecue grill or other cooking or heating appliance, or for pressurized applications such as fueling a turbine or direct injection of the hydrogen-containing gas mixture into the working chamber of an engine.

Figure 14:
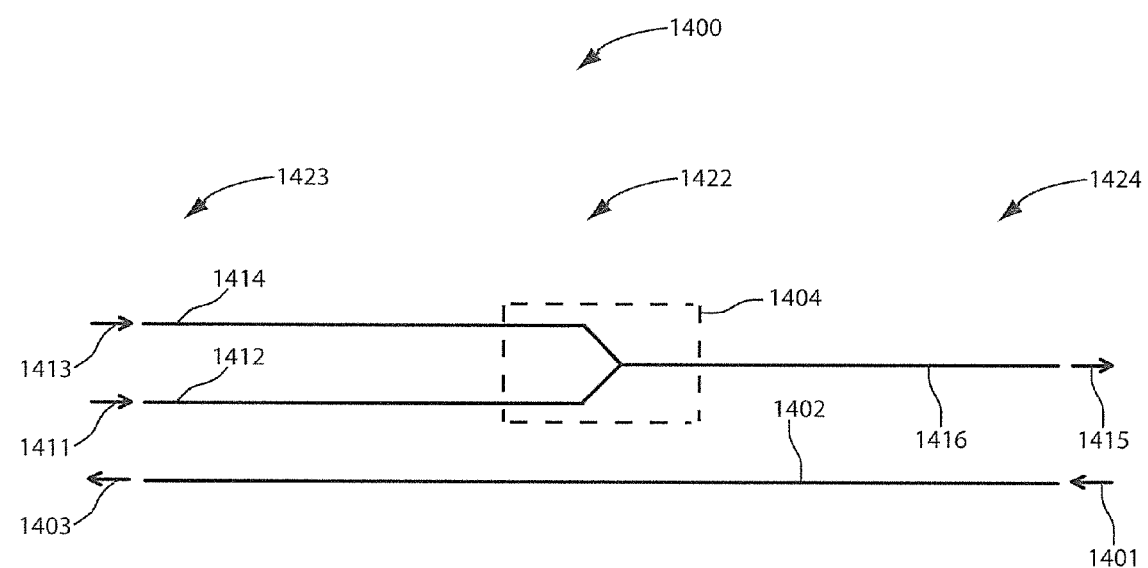
FIG. 14 is a schematic diagram of an autothermal ammonia cracker, constructed in accordance with the invention.

FIG. 14 illustrates a retort embodiment of an autothermal ammonia cracker 1400 having separate pathways for burning ammonia or hydrogen and for decomposing ammonia. Separate pathways are used for obtaining a hydrogen-containing gas mixture that is devoid of both water vapor and residual oxygen, and of reduced nitrogen content. Separate preheating of ammonia and air is also featured, which prevents ignition of ammonia and its decomposition products during preheating. Hence, the autothermal ammonia cracker 1400 is not adversely affected by catalytic activity, and the autothermal ammonia cracker 1400 achieves a high preheat energy state that is not limited by ignition. A counterflow heat exchange relationship exists between vertically stacked elements in 1400, such that temperature is principally a function of horizontal position. The autothermal ammonia cracker 1400 is operationally hot in the middle 1422, and operationally relatively cool on the ends 1423 and 1424. Flowing gases are depicted by arrows showing the direction of flow. The autothermal ammonia cracker 1400 is a unified structure. That is, all processes performed by the autothermal ammonia cracker 1400 occur within a single heat exchanger, rather than requiring a plurality of separate heat exchangers.

Ammonia 1401 enters endothermic decomposition channel 1402, and the ammonia 1401 is preheated within channel 1402 between end 1424 and the middle 1422. The ammonia 1401 may be decomposed non-catalytically into hydrogen and nitrogen near the middle 1422 at a gas temperature higher than 1400° C., or higher than 1300° C. at a gas pressure higher than 1 bar, or higher than 1200° C. at a gas pressure higher than 10 bars, and the hydrogen and nitrogen are cooled between the middle 1422 and end 1423. The ammonia 1401 is thereby transformed into a hydrogen-containing gas mixture 1403.

The gas pressure in channel 1402 may be substantially higher than the gas pressure in burner 1404. The ammonia 1401 may be pressurized such that the hydrogen-containing gas mixture 1403 exits channel 1402 at a pressure that is high enough for direct injection into the working chamber of an engine, without need for pressurizing the burner 1404 or its inputs, which are air 1413 and a burner fuel 1411.

The burner fuel 1411 enters fuel channel 1412, and air 1413 enters air channel 1414. The air 1413 and burner fuel 1411 are separately flowed into the burner 1404 and burned, thereby producing an exhaust gas 1415 and releasing heat. This heat is transferred to channel 1402 for decomposing the ammonia 1401 therein.

The burner fuel 1411 and air 1413 are preheated separately within channels 1412 and 1414 in conjunction with cooling of the hydrogen-containing gas mixture 1403 within channel 1402 between end 1423 and the middle 1422. The exhaust gas 1415 is cooled within the exhaust channel 1416 in conjunction with preheating of the ammonia 1401 within channel 1402 between the middle 1422 and end 1424. The next incoming burner fuel 1411, air 1413, and ammonia 1401 are thereby separately preheated in conjunction with the cooling of the hydrogen-containing gas mixture 1403 and exhaust gas 1415.

The burner fuel 1411 may be ammonia, in which case the burner fuel 1411 is part of the total ammonia 1401 and 1411 that is preheated separately from the air 1413. Otherwise a portion of the now-cooled hydrogen-containing gas mixture 1403 may be diverted and reserved for use as the burner fuel 1411, in which case the reserved portion is preheated within channel 1412 and then burned within or downstream of the burner 1404 to release heat for decomposing the ammonia 1401. In yet another example, all of the hydrogen-containing gas mixture 1403 is used as the fuel for a fuel cell, which consumes a portion of the hydrogen, leaving the remainder as an "anode off-gas" containing leftover hydrogen and possibly non-decomposed ammonia. In that case the anode off-gas is the portion reserved for use as the burner fuel 1411. Whether burned as ammonia or hydrogen or a combination thereof, the burner fuel 1411 is the portion of the total ammonia that is burned with the air 1413. The combination of the hydrogen-containing gas mixture 1403 and the exhaust gas 1415 is thereby formed from the total ammonia 1401 (or 1401 and 1411 if the burner fuel 1411 is supplied as additional ammonia) and from the air 1413.

An excess of air 1413 may be used for balancing the total high temperature heat capacities of gases flowing through the burner 1404 and channel 1402. These heat capacities are balanced when air 1413 is supplied in a "lambda" ratio of up to about 3 times that required for stoichiometric combustion of the burner fuel 1411. A lambda ratio of about 2.95 is appropriate for dry air 1413 containing 21% oxygen by volume, a burner fuel 1411 consisting of ammonia or a mixture of 75 percent hydrogen and 25 percent nitrogen or a combination thereof, and an equivalence ratio of 6.66 at the theoretical limit, which can be closely approached by the autothermal ammonia cracker 1400. A lambda ratio of about 1.58 is appropriate for the same but with an equivalence ratio of 4. For the fuel cell arrangement incorporating autothermal ammonia cracker 1400, the burner fuel 1411 has an elevated percentage of nitrogen, and lambda ratios of 2.17 and 1.16 are appropriate for equivalence ratios of 6.66 and 4, respectively. The equivalence ratio is the chemical equivalent flow rate of the total ammonia divided by the chemical equivalent flow rate of the ammonia and/or hydrogen entering channel 1412 as the burner fuel 1411. Sufficient or excess air 1413 burns all of the burner fuel 1411.

The autothermal ammonia cracker 1400 may be expanded into multiple parallel sets of channels in a multichannel monolith. Separate burner fuel 1411 and air 1413 enter multiple channel pairs 1412 and 1414 on end 1423, and the decomposed ammonia 1403 exits a separate set of ammonia decomposition channels 1402 on the same end 1423. The channel pairs for burner fuel 1412 and air 1414 are merged into single channels 1416 near the middle 1422, and this merging region is the burner 1404. Exhaust gas 1415 exits through these merged channels 1416, and ammonia 1401 enters the ammonia decomposition channels 1402 on end 1424. The monolith may be vacuum jacketed along the sides, and it may be started by electrical resistive heating or by combustion of flammable mixtures near the center 1422 of the monolith.

Figure 15:
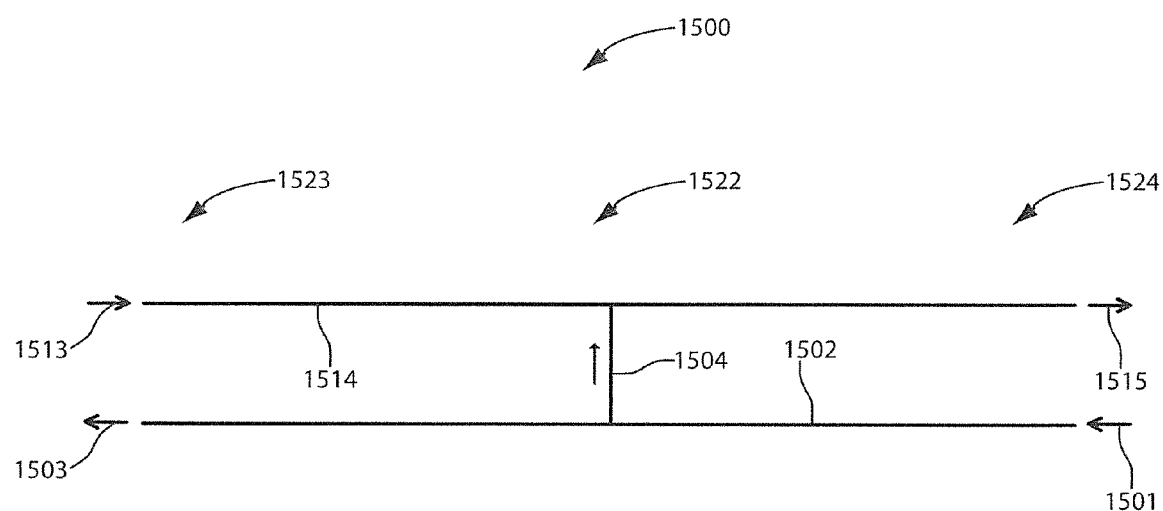
FIG. 15 is a schematic diagram of an autothermal ammonia cracker, constructed in accordance with the invention.

FIG. 15 illustrates a second retort embodiment of an autothermal ammonia cracker 1500 also having separate pathways for burning ammonia or hydrogen and for decomposing ammonia. Separate preheating of ammonia and air is also featured, which prevents ignition of ammonia and its decomposition products during preheating. Hence, the autothermal ammonia cracker 1500 is not adversely affected by catalytic activity, and the autothermal ammonia cracker 1500 achieves a high preheat energy state that is not limited by ignition. Furthermore, the "burner fuel" is transferred from channel 1502 to channel 1514 through channel 1504 near the middle 1522 of autothermal ammonia cracker 1500, such that the burner fuel need not be heat exchanged down in temperature and then back up. A counterflow heat exchange relationship exists between vertically stacked elements in 1500, such that temperature is principally a function of horizontal position. The autothermal ammonia cracker 1500 is operationally hot in the middle 1522, and operationally relatively cool on the ends 1523 and 1524. Flowing gases are depicted by arrows showing the direction of flow. The autothermal ammonia cracker 1500 is a unified structure. That is, all processes performed by the autothermal ammonia cracker 1500 occur within a single heat exchanger, rather than requiring a plurality of separate heat exchangers. In fact, all of the autothermal ammonia crackers 800, 1300, 1400 and 1500 are unified structures.

Ammonia 1501 enters endothermic decomposition channel 1502, and the ammonia 1501 is preheated within channel 1502 between end 1524 and the middle 1522. The ammonia 1501 may be decomposed non-catalytically into hydrogen and nitrogen near the middle 1522 at a gas temperature higher than 1400° C., or higher than 1300° C. at a gas pressure higher than 1 bar, or higher than 1200° C. at a gas pressure higher than 10 bars, and the hydrogen and nitrogen are cooled between the middle 1522 and end 1523. A majority of the ammonia 1501 is thereby transformed into a hydrogen-containing gas mixture 1503.

The ammonia 1501 is preheated within channel 1502 in conjunction with cooling of the exhaust gas 1515 within channel 1514 between end 1524 and the middle 1522. Air 1513 is preheated within channel 1514 in conjunction with cooling of the hydrogen-containing gas mixture 1503 within channel 1502 between end 1523 and the middle 1522. The next incoming air 1513 and ammonia 1501 are thereby separately preheated in conjunction with the cooling of the hydrogen-containing gas mixture 1503 and exhaust gas 1515.

A minor portion of the ammonia 1501 leaves channel 1502 and enters channel 1514 near the middle 1522 through channel 1504. The portion of the ammonia passing through channel 1504 is preheated and may also be partially or fully decomposed before reaching channel 1514. Hence a portion of the preheated ammonia 1501 is burned as ammonia or hydrogen or a combination thereof with the preheated air 1513 downstream of the intersection of channels 1504 and 1514, thereby releasing heat and forming an exhaust gas 1515. This heat is transferred to channel 1502 for decomposing the ammonia 1501 therein. Whether burned as ammonia or hydrogen or a combination thereof, the gas flowing through channel 1504 is the portion of the total ammonia that is burned with the air 1513. The combination of the hydrogen-containing gas mixture 1503 and the exhaust gas 1515 is thereby formed from the ammonia 1501 and from the air 1513.

An excess of air 1513 may be used for balancing the total high temperature heat capacities of gases flowing through channels 1502 and 1514. These heat capacities are balanced when air 1513 is supplied in a lambda ratio of about 1.5 to 3 times that required for stoichiometric combustion of the gases moving through channel 1504. A lambda ratio of about 2.95 is appropriate for dry air containing 21% oxygen by volume and an equivalence ratio of 6.66 at the theoretical limit, which can be closely approached by the autothermal ammonia cracker 1500. A lambda ratio of about 1.58 is appropriate for the same but with an equivalence ratio of 4. The equivalence ratio is the mass flow rate of the ammonia 1501 divided by the mass flow rate of gas in channel 1504. Sufficient or excess air 1513 burns all of the hydrogen and/or ammonia flowing into channel 1514 through channel 1504.

The autothermal ammonia cracker 1500 may be expanded into multiple sets of channels in a multichannel monolith. Air 1513 enter multiple combustion channels 1514 on end 1523, and the hydrogen-containing gas mixture 1503 exits a separate set of ammonia decomposition channels 1502 on the same end. Adjacent channels for combustion 1514 and ammonia decomposition 1502 are connected through fixed or variable channels 1504 near the middle 1522. Channels 1504 may simply be holes in partitions between adjacent channels 1502 and 1514, or they may be series of holes or porous frits. The mass flow of ammonia in channels 1504 may be controlled by a pressure difference between channels 1502 and 1514, wherein the gas pressure in channels 1502 is higher than the gas pressure in channels 1514. Exhaust gas 1515 exits through the combustion channels 1514, and ammonia 1501 enters the ammonia decomposition channels 1502 on end 1524. The monolith may be vacuum-jacketed along the sides, and it may be started by electrical resistive heating or by combustion of flammable mixtures near the center 1522 of the monolith.

All autothermal ammonia crackers 800, 1300, 1400, and 1500 preheat gaseous ammonia and an oxygen-containing gas mixture in conjunction with cooling of reaction products which are formed from the ammonia and from the oxygen-containing gas mixture, provide heat for decomposing ammonia by burning a portion of the ammonia or by burning a portion of the products of ammonia decomposition, and may be operated at gas temperatures higher than 1400° C., or higher than 1300° C. at a gas pressure higher than 1 bar, or higher than 1200° C. at a gas pressure higher than 10 bars. All autothermal ammonia crackers 800, 1300, 1400, and 1500 are unified structures. In the case that an arrangement has a plurality of autothermal ammonia crackers 800, 1300, 1400, or 1500, or a combination thereof, each autothermal ammonia cracker performs all of its processes within a single heat exchanger. Autothermal ammonia crackers 800, 1400, and 1500 separately preheat ammonia and an oxygen-containing gas mixture in conjunction with cooling of reaction products which are formed from the ammonia and from the oxygen-containing gas mixture.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Having described our invention, we claim:

1. A method of autothermally cracking ammonia with air or oxygen, comprising the steps of:
    providing a counterflow heat exchanger having a first inlet for receiving gaseous ammonia, a second inlet, separate from the first, for receiving an oxygen-containing gas mixture, an outlet for expelling a hydrogen-containing gas mixture, a combustor, incoming flow channels for separately flowing the ammonia and the oxygen-containing gas mixture from the respective inlets to the combustor, and one or more outgoing flow channels for flowing the hydrogen-containing gas mixture to the outlet;
    flowing the ammonia into the first inlet;
    flowing the oxygen-containing gas mixture into the second inlet;
    separately preheating the ammonia and the oxygen-containing gas mixture within the incoming flow channels;
    separately flowing the preheated ammonia and the preheated oxygen-containing gas mixture into the combustor;
    combusting the preheated ammonia and the preheated oxygen-containing gas mixture within or downstream of the combustor, thereby forming the hydrogen-containing gas mixture from the ammonia and from the oxygen-containing gas mixture;
    cooling the hydrogen-containing gas mixture within one or more of the outgoing flow channels; and
    flowing the hydrogen-containing gas mixture out of the outlet;
    wherein the heat exchanger performs the cooling of the hydrogen-containing gas mixture in conjunction with the preheating of the next incoming ammonia and also in conjunction with the preheating of the next incoming oxygen-containing gas mixture.

2. The method of claim 1, wherein the ammonia and the oxygen-containing gas mixture are combusted at a gas temperature that is higher than 1200° C.

3. The method of claim 1, wherein the ammonia and the oxygen-containing gas mixture are combusted at a gas temperature that is higher than 1300° C.

4. The method of claim 1, wherein the ammonia and the oxygen-containing gas mixture are combusted at a gas temperature that is higher than 1400° C.

5. The method of claim 2, wherein the ammonia and the oxygen-containing gas mixture are combusted at a gas pressure that is higher than 10 bars.

6. The method of claim 3, wherein the ammonia and the oxygen-containing gas mixture are combusted at a gas pressure that is higher than 1 bar.

7. The method of claim 1, including a control method of using a temperature sensor and feedback control of a ratio of the ammonia to the oxygen-containing gas mixture for obtaining a target operating temperature, the control method comprising:
    monitoring an operating temperature with the temperature sensor;
    increasing the ratio of the ammonia to the oxygen-containing gas mixture if the monitored operating temperature is higher than the target operating temperature; and
    decreasing the ratio of the ammonia to the oxygen-containing gas mixture if the monitored operating temperature is lower than the target operating temperature.

8. The method of claim 1, including a starting method, the starting method comprising:
    flowing a starting mixture into the heat exchanger, wherein the starting mixture comprises a fuel component and an oxidizer component, separate from the fuel component;
    separately flowing the fuel component and the oxidizer component into the combustor;
    combusting the starting mixture within or downstream of the combustor, thereby releasing heat for raising a temperature of the heat exchanger.

9. A method of autothermally cracking ammonia with air or oxygen, comprising the steps of:
    providing a counterflow heat exchanger having one or more inlets in gas flow communication with one or more incoming flow channels, one or more outgoing flow channels in gas flow communication with an outlet, and a turnaround region in gas flow communication with the incoming and outgoing flow channels;
    flowing gaseous ammonia into an inlet of the heat exchanger;

flowing an oxygen-containing gas mixture into an inlet of the heat exchanger;

preheating the ammonia within one or more of the incoming flow channels;

preheating the oxygen-containing gas mixture within one or more of the incoming flow channels;

combusting the preheated ammonia and the preheated oxygen-containing gas mixture within the heat exchanger at a gas temperature that is higher than 1400° C., or at a gas temperature that is higher than 1300° C. in combination with a gas pressure that is higher than 1 bar, or at a gas temperature that is higher than 1200° C. in combination with a gas pressure that is higher than 10 bars, thereby forming a hydrogen-containing gas mixture from the ammonia and from the oxygen-containing gas mixture;

cooling the hydrogen-containing gas mixture within one or more of the outgoing flow channels; and flowing the hydrogen-containing gas mixture out of the outlet of the heat exchanger;

wherein the heat exchanger performs the cooling of the hydrogen-containing gas mixture in conjunction with the preheating of the next incoming ammonia and also in conjunction with the preheating of the next incoming oxygen-containing gas mixture.

10. The method of claim 9, wherein the ammonia and the oxygen-containing gas mixture are preheated together as a single reactant mixture, the method further comprising the steps of:

combining the ammonia and the oxygen-containing gas mixture into a single reactant mixture containing ammonia and oxygen;

flowing the reactant mixture into one or more of the incoming flow channels; and preheating the reactant mixture to ignition within one or more of the incoming flow channels;

wherein the heat exchanger performs the cooling of the hydrogen-containing gas mixture in conjunction with the preheating of the next incoming reactant mixture.

11. The method of claim 9, wherein the ammonia and the oxygen-containing gas mixture are flowed into separate inlets and preheated separately before combustion, the method further comprising the steps of:

providing a combustor within the heat exchanger;

separately flowing the preheated ammonia and the preheated oxygen-containing gas mixture into the combustor; and combusting the preheated ammonia and the preheated oxygen-containing gas mixture within or downstream of the combustor.

12. A method of autothermally cracking ammonia with an oxygen-containing gas mixture, comprising the steps of:

providing a counterflow heat exchanger having flow channels for separately preheating gaseous ammonia and an oxygen-containing gas mixture in conjunction with cooling of reaction products which are formed from the ammonia and from the oxygen-containing gas mixture;

separately preheating the ammonia and the oxygen-containing gas mixture by the heat exchanger;

decomposing some or all of the preheated ammonia within the heat exchanger, thereby forming a hydrogen-containing gas mixture from at least a portion of the ammonia;

burning a portion of the preheated ammonia or a portion of the hydrogen-containing gas mixture with the preheated oxygen-containing gas mixture within the heat exchanger, thereby forming an exhaust gas and releasing heat for the decomposition of the ammonia; and cooling the exhaust gas and the hydrogen-containing gas mixture by the heat exchanger;

wherein the heat exchanger performs the cooling of the exhaust gas and the hydrogen-containing gas mixture in conjunction with the preheating of the next incoming ammonia and next incoming oxygen-containing gas mixture.

13. The method of claim 12, wherein the ammonia is decomposed at a gas temperature that is higher than 1400° C., or at a gas temperature that is higher than 1300° C. in combination with a gas pressure that is higher than 1 bar, or at a gas temperature that is higher than 1200° C. in combination with a gas pressure that is higher than 10 bars.

14. The method of claim 12, wherein the hydrogen-containing gas mixture and the exhaust gas are cooled as separate mixtures.

15. The method of claim 14, further comprising:

preheating a reserved portion of the cooled hydrogen-containing gas mixture separately from the ammonia and separately from the oxygen-containing gas mixture by the heat exchanger; and burning the preheated reserved portion of the hydrogen-containing gas mixture with the preheated oxygen-containing gas mixture within the heat exchanger, thereby forming the exhaust gas and releasing heat for the decomposition of the ammonia.

16. A method of starting an autothermal ammonia cracker, comprising the steps of:

providing a counterflow heat exchanger having a first inlet in gas flow communication with a first set of one or more incoming flow channels, a second inlet in gas flow communication with a second set of one or more incoming flow channels, wherein the first and second inlets are separate, a set of one or more outgoing flow channels in gas flow communication with an outlet, and a turnaround region or combustor in gas flow communication with the incoming and outgoing flow channels;

flowing a flammable starting mixture into the heat exchanger in conjunction with a starting period, wherein the starting mixture comprises a fuel component and an oxidizer component, separate from the fuel component;

flowing the fuel component into the first inlet;

flowing the oxidizer component into the second inlet;

separately flowing the fuel component and the oxidizer component through the incoming flow channels and into the turnaround region or combustor;

combusting the starting mixture within or downstream of the turnaround region or combustor, thereby releasing heat for raising a temperature of the heat exchanger.

17. The method of claim 16, further comprising: providing a catalyst within the heat exchanger.

18. The method of claim 16, wherein the fuel component comprises ammonia or hydrogen and the oxidizer component comprises oxygen or air.

19. The method of claim 16, further comprising a running method used after the starting period, the running method comprising:

separately flowing gaseous ammonia and an oxygen-containing gas mixture into the separate inlets of the heat exchanger;

separately preheating the ammonia and the oxygen-containing gas mixture within the incoming flow channels;

separately flowing the preheated ammonia and the preheated oxygen containing gas mixture into the turnaround region or combustor;

combusting the preheated ammonia and the preheated oxygen-containing gas mixture within or downstream of the turnaround region or combustor, thereby forming a hydrogen-containing gas mixture from the ammonia and from the oxygen-containing gas mixture;

cooling the hydrogen-containing gas mixture within the outgoing flow channel or channels;

flowing the hydrogen-containing gas mixture out of the outlet;

wherein the heat exchanger performs the cooling of the hydrogen-containing gas mixture in conjunction with the preheating of the next incoming ammonia and also in conjunction with the preheating of the next incoming oxygen-containing gas mixture.

20. The method of claim 16, further comprising a running method used after the starting period, the running method comprising:

combining gaseous ammonia and an oxygen-containing gas mixture into a single reactant mixture containing ammonia and oxygen;

flowing the reactant mixture into one or both sets of incoming flow channels;

preheating the reactant mixture within one or more of the incoming flow channels;

combusting the reactant mixture within the heat exchanger, thereby forming a hydrogen-containing gas mixture from the reactant mixture;

cooling the hydrogen-containing gas mixture within the outgoing flow channel or channels;

flowing the hydrogen-containing gas mixture out of the outlet;

wherein the heat exchanger performs the cooling of the hydrogen-containing gas mixture in conjunction with the preheating of the next incoming reactant mixture.

* * * * *